US006476854B1

(12) United States Patent
Emerson et al.

(10) Patent No.: US 6,476,854 B1
(45) Date of Patent: Nov. 5, 2002

(54) VIDEO EAVESDROPPING AND REVERSE ASSEMBLY TO TRANSMIT VIDEO ACTION TO A REMOTE CONSOLE

(75) Inventors: Theodore F. Emerson, Houston; Peter J. Michaels, Plano; Jeoff Krontz, Houston, all of TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 863 days.

(21) Appl. No.: 08/733,254

(22) Filed: Oct. 18, 1996

(51) Int. Cl.[7] ............................................... H04N 7/18
(52) U.S. Cl. ...................................................... 348/143
(58) Field of Search .......................... 348/15, 16, 143, 348/150–155, 169; H04N 7/18

(56) References Cited

U.S. PATENT DOCUMENTS

| | | | | |
|---|---|---|---|---|
| 5,111,288 A | * | 5/1992 | Blachshear | 348/143 |
| 5,202,759 A | * | 4/1993 | Laycock | 348/152 |
| 5,218,627 A | * | 6/1993 | Corey et al. | 348/16 |
| 5,521,634 A | * | 5/1996 | McGary | 348/169 |
| 5,598,209 A | * | 1/1997 | Cortjens et al. | 348/15 |

FOREIGN PATENT DOCUMENTS

JP        59-93675        * 12/1984

* cited by examiner

Primary Examiner—Richard Lee
(74) Attorney, Agent, or Firm—Akin, Gump, Strauss, Hauer & Feld, LLP

(57) ABSTRACT

A computer system having integrated remote console functionality. Cycles intended for a video graphics controller are snooped to acquire the video data or control information contained in the cycle. Analysis is performed on the video data to detect sequential or repetitive operations. The video data is encoded into higher level primitives, if possible. The video data and primitives are held in a first-in-first-out (FIFO) memory until the FIFO reaches a critical level, or a staleness timer times out. Special firmware executed in system management mode reads the FIFO and converts the video data and primitives into conventional ASCII text or the required format. The firmware also maintains a copy of the video frame buffer to further encode the video data, if possible. The firmware then transmits the conventional ASCII text via a modem to a user stationed at a remote computer system.

29 Claims, 15 Drawing Sheets

VIDEO EAVESDROPPING AND REVERSE ASSEMBLY TO TRANSMIT VIDEO ACTION TO A REMOTE CONSOLE

BACKGROUND OF THE INVENTION

1. Field of the Invention

The invention relates to remote control of computer systems, including servers, and more particularly to a method and apparatus for passing video display information to a remote console.

2. Description of the Related Art

Advances in computing technology have caused a shift away from centralized mainframe computing to distributed computing using multiple personal computers (PCs) connected to a network. The network typically includes one or more server class personal computers to handle file, print and application services which are common to all the connected PCs. Therefore, the server becomes an important resource which the entire network depends upon.

Oftentimes, businesses may require more than one server. Networks may demand isolation for security reasons. Networks may be logically subdivided for performance or practical reasons. In particular, networks may be in different geographic locations. However, oftentimes the maintenance of the servers falls onto a single group or person, called a network administrator. In these cases where the server is in an inconvenient location, it is desirable for the network administrator to be able to monitor the health of the server without traveling to its location.

In the past, the network administrator operating from a local computer could telephonically connect into the operating system of a remote server to monitor its health using a conventional communications package such as PC Anywhere or Procomm. This method required a third communications computer to be attached to the network. Typically, a connection would first be established from the local computer to the communications computer attached to the network of the server. If the server was operating, the network administrator would be prompted for a login password to access network resources, including the server. If the server was down, only the personal computer could be accessed (providing that PC had its own modem). After the administrator logged into the network, a server console utility, such as RCONSOLE, could be executed to gain access to the server. Because many times the server would be down, this method had limited usefulness. Additionally, only limited information was provided, since the server would have to be operating before the server console utility would operate.

Network administrators also have used products such as Compaq's Insight Manager. This software product is loaded by the operating system to allow users to connect to the operating system through a dedicated modem using (remote access service) RAS/PPP (point to point) protocols. This method also allows insight into the operating system, but only after the server is operating.

To help in this regard, an accessory known as Compaq Server Manager R was developed. This accessory was essentially a personal computer system board adapted to an add-in card. Server manager R included a processor, memory, modem and software to operate independently of the server to which it was installed. To monitor the server in a remote location, the network administrator at a local computer would dial into the server manager R board and establish a communications link. If a connection was established, the processor of server manager R would periodically acquire access to an expansion bus of the server to read the contents of the server video memory. The processor would then send the contents to the local computer via the communications link. A separate power supply was provided to the server manager R board so that it would operate even while the server was booting or powered down. Although the functionality provided by the server manager R board was desired, because it was essentially a second computer, the high cost of this solution limited its success.

SUMMARY OF THE INVENTION

The present invention disclosed and claimed herein includes a method and apparatus for monitoring video activity, reverse assembling the video transactions and transmitting the video transactions from a remote computer to a local computer. The local computer has a modem and conventional communications software for communicating with the remote computer of the preferred embodiment. The preferred embodiment includes hardware and software components, but other configurations are contemplated. An integrated remote console (IRC) device is provided in the remote computer for snooping video transactions passed on a bus from a processor to a video controller and for compressing the video transactions into an encoded format. Data and address comparison logic is provided in the IRC device to encode block move operations and fill operations (repetitive character strings). The data is encoded into a proprietary data stream which includes addressing information. A first in first out (FIFO) buffer accumulates the data until a threshold is reached and a system management interrupt (SMI) is indicated.

The processor of the remote computer enters a system management mode (SMM) when the SMI is indicated. This allows the processor to perform tasks independent of the operating system. The processor reads the data from the FIFO into a temporary buffer in SMM memory. Also in SMM memory, a copy of the video frame buffer of the local computer is maintained. The processor eventually provides the data to the local computer so maintenance of the local video frame buffer copy is possible. The processor compares the data in the temporary buffer to the local video frame buffer copy to determine what, if any, data should be sent to the local computer. Any previously provided data is disregarded as redundant.

Before the data is provided to the local computer, the data is translated into an American National Standards Institute (ANSI) character set. As the data is translated, the data in the temporary buffer is further examined to determine if the data can be represented by one of the ANSI command sequences, such as line scroll or clear screen. This provides further data compression which results in a more efficient system. Finally, the ANSI data is transmitted to the remote computer via a modem which is under control of the processor running in system management mode.

Inactivity timers are provided to detect periods of inactivity to the video memory and the video controller of the computer. If inactivity is detected, the FIFO and temporary buffer are flushed out to the local computer. This assures that data is timely displayed at the local computer.

Buffer overflow detection logic is provided to assure the integrity of the data. If an overflow condition is detected for the FIFO or temporary buffer, the local video frame buffer copy is replaced with a snapshot of the video buffer of the remote computer. This resynchronizes the video display of the local computer to the video display of the remote computer.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

The following patents or patent applications are hereby incorporated by reference:

U.S. application Ser. No. 08/733,521, entitled "Transparent Keyboard Hot Plug," by Theodore F. Emerson, Jeoff M. Krontz, and Dayang Dai, filed concurrently herewith; and U.S. patent application Ser. No. 08/733,145, entitled "Modem Sharing," to Theodore F. Emerson and Jeoff M. Krontz, and commonly assigned to the assignee of the present patent.

Figure 1:
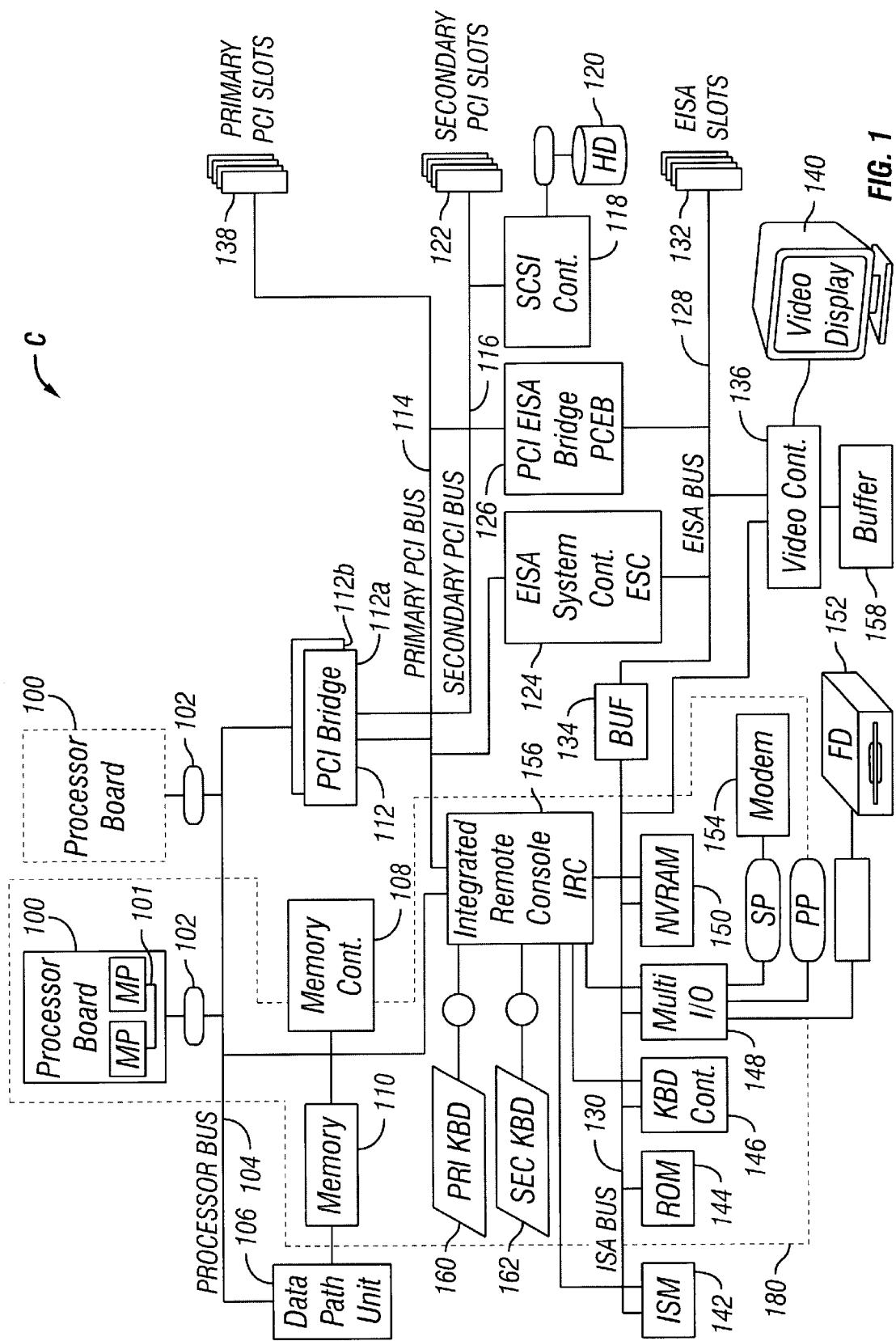
FIG. 1 is a block diagram illustrating a computer system C according to the preferred embodiment of the present invention.

Referring now to FIG. 1, a computer system C according to the preferred embodiment of the present invention is shown. The computer system C is a server class computer system having integrated remote console (IRC) features. Remote console refers to a computer system in a remote location, relative to the computer system C, which is used to check status and administrate the computer system C by dialing into the computer system C from the remote location.

Thus, in this configuration the computer system C of FIG. 1 is known as a remote computer system C. The integrated remote console features of the present invention provide facilities to allow an operator to remotely access and administrate the remote computer system C without operating system intervention or dependence. Although the preferred embodiment is a server class computer system, the principles of the present invention can be used in a traditional networked environment to monitor client workstations.

To provide sufficient processing capability for enterprise-class server applications, the computer system C of FIG. 1 deploys one or more processors boards 100. Each processor board 100 includes one or more microprocessors 101, such as the Pentium or preferably the Pentium Pro processor available from Intel Corporation located in Santa Clara, Calif., and a local memory cache (not shown). The Pentium Pro processor includes a primary and secondary cache, and thus, the local memory cache of the processor boards 100 is a third level cache. Each processor 101 includes a special non-maskable interrupt, called the System Management Interrupt (SMI), which is fully explained in the Pentium and Pentium Pro databooks available from Intel Corporation and hereby incorporated by reference. Of course, other types of processors supporting an SMI can be used. Preferably each processor board 100 supports two Pentium Pro™ processors 101, with each processor board 100 connecting to a main system board (not specifically numbered) through a processor slot 102. For purposes of this disclosure, a single processor 101 is assumed as only one processor will be responsible for the SMI processing described herein.

The processor slots 102 are connected to a Pentium Pro host bus called the processor bus 104. The processor bus 104 is a high performance bus utilizing Gunning transceiver logic (GTL) as generally defined by the Pentium Pro databooks.

In addition to the processors boards 100, the processor bus 104 is connected to a data path unit 106, such as an Intel 82452GX, and a memory controller 108, such as an Intel 82453GX, which collectively form a memory control subsystem for a memory array 110. The memory 110 includes several slots for receiving memory modules, such as a 72-pin extended data output (EDO) dynamic random access memory (DRAM) module. The memory controller 108 provides control and timing to the memory 110, while the data path unit 106 interfaces a 72-bit data portion of the processor bus 104 to the memory 110. The memory controller 108 and the data path 106 are capable of taking a memory request from the processor board 100, queuing it, and responding after the requested operation has completed. Additionally, the memory controller 108 provides memory error correction which is vital in server applications, including the capability of single-bit and multi-bit error detection on the fly. The memory controller 108 can handle up to four gigabytes of DRAM. Memory arrangements having non-interleaved, x2 and x4 interleaving configurations are supported by the memory control subsystem.

In addition to the memory subsystem, the processor bus 104 connects to one or more Peripheral Component Interconnect (PCI) bridges 112, such as an Intel 82454GX. The PCI bridges 112 provide the necessary logic and control for passing bus cycles between the processor bus 104 and a primary PCI bus 114 and a secondary PCI bus 116. The PCI bus provides a combination of high performance and scalable I/O for the demanding environment faced in server applications. The peer-to-peer arrangement of the PCI bus eliminates one or more levels of arbitration present in an alternative hierarchical arrangement, resulting in higher system performance. The PCI bridges 112 integrate bus arbitration logic for connection of up to two bridges without any external glue logic. One PCI bridge 112a, providing the primary PCI bus 114, is configured to be the compatibility PCI bridge by strapping options at power-up. This PCI bridge 112a provides a PC compatible path to a boot ROM and further PC expansion buses.

A second PCI bridge 112b, called an auxiliary bridge, provides the secondary PCI bus 116 and is configured by strapping options to be the auxiliary PCI bridge. The auxiliary bridge 112b has an external arbiter which arbitrates accesses to the host after the compatibility bridge 114 has been serviced.

Normally, the arbitration for the processor bus 104 is controlled by the compatibility bridge, which has a higher priority than the auxiliary bridge to ensure a proper response time for ISA bus masters. The plurality of PCI bridges 112 provide a plurality of PCI buses, which because of their direct connections to the processor bus 104, provide inherently faster arbitration response than the alternative of cascading PCI bridges together to provide for multiple PCI buses. This ability not only provides for design flexibility, but also for redundant I/O channels for server systems in which reliability is paramount.

As in the memory controller 108, the PCI bridges 112 support a fill 72-bit data interface to the processor bus 104, including support for all protocols as well as error correction. The PCI bridges 112 support an 8-deep transaction in-order queue as well as separate 4-deep queues for both outbound (processor to PCI) and inbound (PCI to processor) transactions that are for the I/O bus agent. Also, like the memory controller 108, the PCI bridges 112 provide four 32-byte data buffers in both the inbound and outbound directions. The buffers decouple the processor bus 104 from the PCI buses 114–116 and optimize performance by allowing the posting of data at full bus speeds in both directions. However, unlike the memory controller 108, the PCI bridges 112 support up to two outstanding delayed transaction requests. This feature allows a bus transaction to be split and completed later, preventing the Pentium Pro processor bus 104 from becoming blocked by long latency I/O operations. In this mode, the PCI bridges 112 would defer Pentium Pro™ memory reads, I/O reads, I/O writes, and interrupt acknowledge transactions. However, memory write transactions are not deferred since they are better optimized through posting.

Attached to the secondary PCI bus 116 is a Small Computer System Interface (SCSI) controller 118, such as an 53C825 from National Cash Register (NCR) or Symbios Logic. The SCSI controller 118 provides the capability of handling simultaneous disk commands which is desirable in a multi-threaded, multi-tasking operating system. Attached to the SCSI controller 118 through a connector is one or more SCSI devices, such as a hard drive 120. Other SCSI peripherals, such as compact disk read only memory (CD-ROM) drives and tape drives, may also be attached. In an alternative embodiment, the hard disk drive 120 can also be a Redundant Array of Inexpensive Disks (RAID) data storage device. The ability to overlap commands and queue the commands to one or more data storage devices can significantly boost performance in environments such as Windows 95™ and NT™. In addition to the SCSI controller 118, a plurality of PCI devices may be plugged into the secondary PCI bus 116 through a plurality of secondary PCI slots 122. A plurality of PCI devices may also be coupled to the primary PCI bus 114 through a plurality of primary PCI slots 138.

Attached to the primary PCI bus 114 is an extended industry standard architecture (EISA) system controller (ESC) 124, such as an Intel 82374EB device, and a PCI-EISA bridge (PCEB) 126, such as an Intel 82375EB. The ESC 124 and the PCEB 126 must be connected to the primary PCI bus 114, as the auxiliary PCI bus controller 112b must request arbitration from the compatible PCI bus controller 112a on some operations. That added latency means that the secondary PCI bus 116 cannot meet PCI version 2.1 latency specifications, and that EISA and ISA bus bridges have to be on the compatibility bus or primary PCI bus 114.

The ESC 124 and the PCEB 126 work in tandem to pass cycles between the primary PCI bus 114 and an EISA bus 128 which further connects to an industry standard architecture (ISA) bus 130. The combination of the ESC 124 and the PCEB 126 provides an I/O subsystem capable of taking advantage of the power of the PCI bus architecture while maintaining access to a large base of EISA and ISA expansion cards, and the corresponding software applications.

With the inclusion of the ESC 124 and the PCEB 126, the computer system C now contains three levels of buses structured in the following hierarchy: processor bus 104 as the execution bus; an expansion bus system having a primary and secondary PCI bus 114–116; and EISA bus as a secondary I/O bus. This bus hierarchy allows concurrency for simultaneous operation on all three bus environments. Data buffering permits concurrency for operations that cross over into another bus environment. The ESC 124 implements system functions such as timer/counter, DMA, interrupt controller, and EISA subsystem control functions such as EISA bus controller and EISA bus arbiter. The PCEB 126 provides the interface to the bridge between the PCI and EISA buses by translating bus protocols in both directions. It uses extensive buffering on both the PCI and EISA interfaces to allow concurrent bus operations.

Attached to the EISA bus 128 is a buffer 134 and a video controller subsystem 136, such as a Cirrus Logic 5424 video controller with 512 k of associated video memory, shown as video buffer 158. The data interface to the video controller 136 is provided by the EISA bus 128 while the remaining interface is attached to the ISA bus 130. A video display or CRT 140 is connectable to the video controller 136 through a connector. The buffer 134 provides the conventional buffering between the EISA bus 128 and ISA bus 130. A plurality of EISA devices may be coupled to the EISA bus 128 through a plurality of EISA slots 132.

Attached to the ISA bus 130 is an integrated system management unit (ISM) 142, flash ROM 144, a keyboard controller 146, such as an Intel 8042, a non-volatile RAM 150, and a general purpose multiple I/O device 148. The multiple I/O device 148 provides a conventional serial port SP and parallel port PP, and is connected to a floppy drive 152. An conventional modem 154, such as a Hayes-compatible modem, is connectable to the serial port SP. Alternatively, the modem 154 could be mounted on an expansion card which is plugged into one of the EISA slots 132. The ESC 124 generates chip select signals for the ISA bus 130 devices.

Also connected to the primary PCI bus 114 is an integrated remote console (IRC) device 156 which forms an integral hardware piece of an IRC subsystem 180. The IRC subsystem 180 of the preferred embodiment is a combination of hardware and special system software called System Management Interrupt (SMI) firmware 1000 (FIG. 10) stored in the ROM 144 and executed by the processor 101.

The present invention is not limited to the partitioning choices of hardware or software of the preferred embodiment as alternative configurations will become apparent to those skilled in the art upon full appreciation of this disclosure. Thus, the invention can be practiced by using a hardwarp or care or only design. For example, the processor 101 includes a I/O trap address bitmap which can be programmed to trap any operations directed to the video controller 136 or video buffer 158 and generate an SMI. Once trapped, the transaction can be processed in accordance with this disclosure.

The IRC subsystem 180 is a function which allows a computer operator virtual access to the keyboard and display of a remote computer of the present invention. Thus, from a local computer an operator has access to a remote computer as if the operator were physically operating the remote computer. This functionality is herein referred to as remote console functionality or facilities. The IRC subsystem 180 performs these remote console functions independent of the operating system through special system software system and the IRC device 156.

At this point it is useful to note that the present invention provides the IRC functionality without burdening the local computer with any special hardware or software requirements. The local computer is only required to have a conventional modem, such as a Hayes compatible modem, and a commercially available communications software, such as Procomm or the like. Thus, the IRC or remote console functionality is fully contained within a remote computer embodying the present invention.

The IRC device 156 is further connected to SMI signals of the processor 101, the ESC device 128, a control portion of the EISA bus 128, the general I/O device 148, the 8042 keyboard controller 146, and the ISM device 142. The IRC device 156 is additionally connectable to a primary keyboard 160 and a secondary keyboard 162 through a pair of connectors to receive keyboard inputs from the user. The primary keyboard 160 connector is mounted on the rear of the server enclosure while the secondary keyboard 162 connector is mounted on the front of the server enclosure. The IRC device 156 is also connected to a hardware security device (not shown), which is in turn connected to the NVRAM 150 and the multiple I/O device 148, to protect the NVRAM 152 from unauthorized accesses.

Overview of the Remote Console Features.

The IRC subsystem 180 provides many individual functions which together provide the remote console functionality, including: video snooping and compression for providing video during remote access; emulation of an attached keyboard during remote access; modem sharing and emulation of a modem during remote access; and hot swapping between front and rear enclosure attached keyboards.

Figure 2:
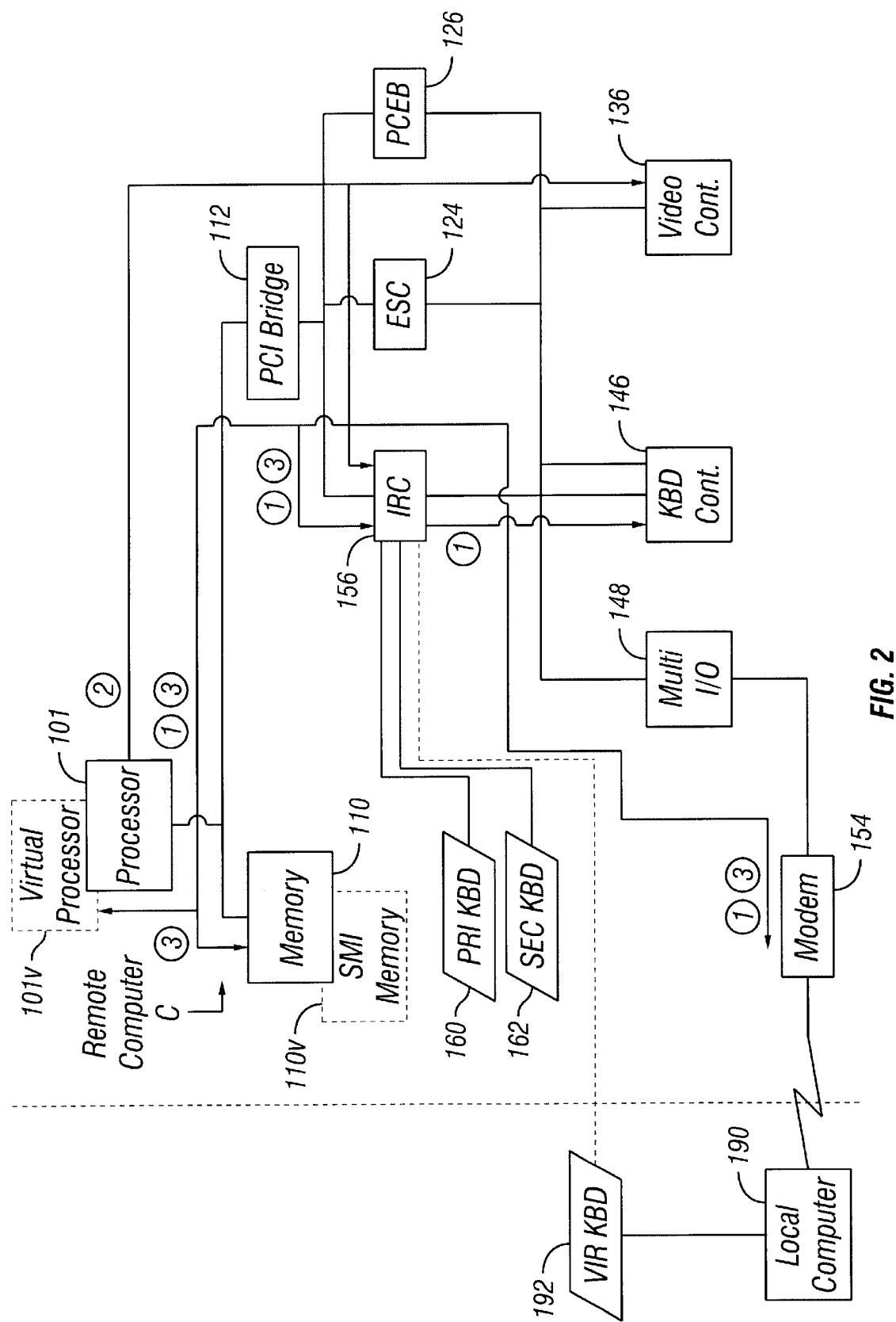
FIG. 2 is a block diagram of a computer system C illustrating data flow paths according to the preferred embodiment.

Reference is now directed to FIG. 2. In the remote computer C, a single modem 154 is shared between the IRC subsystem 180 and the operating system. Of course, multiple modems could be used at a higher cost. Special software running in a system management mode of the processor 101 allows the IRC subsystem 180 to share the single modem 154 with the operating system so that the modem always appears present even when in use by the IRC subsystem 180. When the processor 101 is operating in system management mode a "virtual processor" 101$v$ is created. Reference is directed to Intel processor datasheets, which are hereby incorporated by reference, of the Pentium™ and Pentium Pro™ for more information on system management mode. As to modem sharing, more details can be found in U.S. application Ser. No. 08/733,415 entitled "Modem Sharing," by Theodore F. Emerson and Jeoff M. Krontz, filed concurrently with this application.

Once the remote console function is enabled at the remote computer C, a remote session can be initiated by an operator at a local computer 190 by dialing into the remote computer C via a conventional telephone line. Other communications channels, such as a network, are contemplated. As long as the modem 154 on the remote computer C is not already in use, the IRC subsystem 180 will detect and answer the incoming call to determine if a predetermined sequence, such as a point-to-point protocol (PPP), is present. If a predetermined sequence is present, the IRC subsystem 180 determines that the call is for the operating system, otherwise, the call is determined to be for the IRC subsystem 180.

Once a call is determined to be for the IRC subsystem 180, the attached keyboard(s) 160 and/or 162 are electronically detached in favor of a virtual keyboard 192. For illustration purposes, the virtual keyboard 192 is shown as logically attached to the local computer 190, however, the circuitry for the virtual keyboard 192 is entirely contained within the IRC device 156. The virtual keyboard 192 provides keystrokes to the remote computer C from as if they came from one of the physically attached keyboard(s) so that the operating system is unaware of the source. This is shown as path 1 in FIG. 2. The keystrokes are generated by the operator at the local computer 190 and sent via the telephone line connection. The modem causes the processor 101 to enter the system management mode for processing the keystroke. The virtual processor 101$v$ reads the keystroke data, converts it into a keyboard scan code and writes the scan code into a keyboard data register of the IRC device 156. The IRC device 156 then causes the scan code to be sent to the keyboard controller 146 as if it were sent from an conventional keyboard connected to the keyboard controller 146. The operating system then conventionally receives the keystroke without regard to its source. More information on the virtual keyboard is found in U.S. application Ser. No. 08/733,521, entitled "Transparent Keyboard Hot Plug," by Theodore F. Emerson, Jeoff M. Krontz and Dayang Dai, filed concurrently with this application.

Also, once the call is determined to be for the IRC subsystem 180, video is provided via the telephone line to the local computer so that the operator may view everything that an operator physically present at the remote computer C could view. The IRC device 156 performs snooping on all video activity to non-intrusively capture video data, command and control information as it passes by on the PCI bus 114, as shown as path 2. The IRC device 156 then compresses or encodes the information into a proprietary data stream which is read from the IRC device 156 by the virtual processor 101$v$ when a certain activity threshold is reached, or a staleness timer causes the flushing of video data from the IRC device 156. The virtual processor 101$v$ further compresses the video information as it is translated into an ANSI (American National Standards Institute) character format for transmitting to the local computer 190. The local computer 190 displays the received information on its video monitor when received.

The term "proprietary" is used to distinguish the ANSI data stream to the data stream produced by the IRC device 156. The encoding used to develop the proprietary data stream is disclosed herein.

A portion of memory 110, SMM memory 110$v$, is used by the SMI firmware 1000 to create a copy of the video transmitted to and displayed by the local computer video monitor. This copy is called a virtual frame buffer. The virtual frame buffer used is 8 k bytes in size, which is sufficient to hold 25–50 lines of character mode data. By maintaining a copy of the local computer video display, the SMI firmware 1000 can perform comparisons between the incoming video data and the data present in the virtual frame buffer, thereby avoiding the re-transmission of redundant data or compression of other data. Incoming draw commands are compared to the data resident in the virtual frame buffer to eliminate portions of the screen being inefficiently redrawn by the operating system. Other comparisons are performed to detect video operations that can be reverse assembled into their high level operation, such as clear screen, line scroll. By determining the original high level operation, a plurality of primitive video operations can be replaced with very few high level commands.

It is possible for the IRC 156 to be designed to perform such operations instead of the SMI firmware 1000, however, this would come at the expense of added gates for the memory and processing logic. Performing these functions with the SMI code was desirable since the SMI code was eventually needed to transmit the data to the local computer 190. The further compression and encoding processing before sending the video information to the local computer 190 is shown as path 3. It is noted that the present design handles text mode video data, however, the principles disclosed herein can also apply to graphics mode video data.

The operation of the modem, keyboard and video during a remote session is handled via special SMI firmware 1000 stored in the system ROM 144. This relieves the operating system from tracking such information and removes the necessity of writing special drivers. However, more importantly, because the operating system is not involved, the IRC subsystem 180 operates even without the operating system. Thus, the operator can reboot the remote computer and observe the boot process from a local machine.

A brief description of text mode video is deemed necessary. In text mode every character displayed on the video monitor 140 is assigned a word of two bytes in the video buffer 158. The lower-order byte contains the character code, the high order byte the attribute. In the preferred embodiment, the character code is encoded as ANSI (American National Standard Institute) data. The first 128 characters of the ANSI character set are compatible with the ASCII (American Standard Code for Information Interchange) character set. The attribute code contains information relating to the character code, such as blink condition, background and foreground colors and intensity.

The video buffer 158 is organized differently, depending upon the operational mode of the video controller 136. In a graphics mode, the bytes in the video buffer 158 are no longer interpreted by the video controller 136 as a character code and attribute. Instead, they directly determine the intensity and color of a corresponding pixel. However, in text mode the video buffer 158 is regarded as a linear array. In the preferred embodiment, the memory array is 128 k bytes beginning at an address of hB8000 for color text modes and hB000 for monochrome text mode. A first word of text data written into the video buffer 158 is assigned the character in the upper left corner of the video display 140, beginning at row 1, column 1. A second text word describes the character in row 1, column 2 of the video display 140. Data may be written to the video buffer 158 in either an incremented or decremented addressing fashion.

Overview of the IRC Device.

Figure 3:
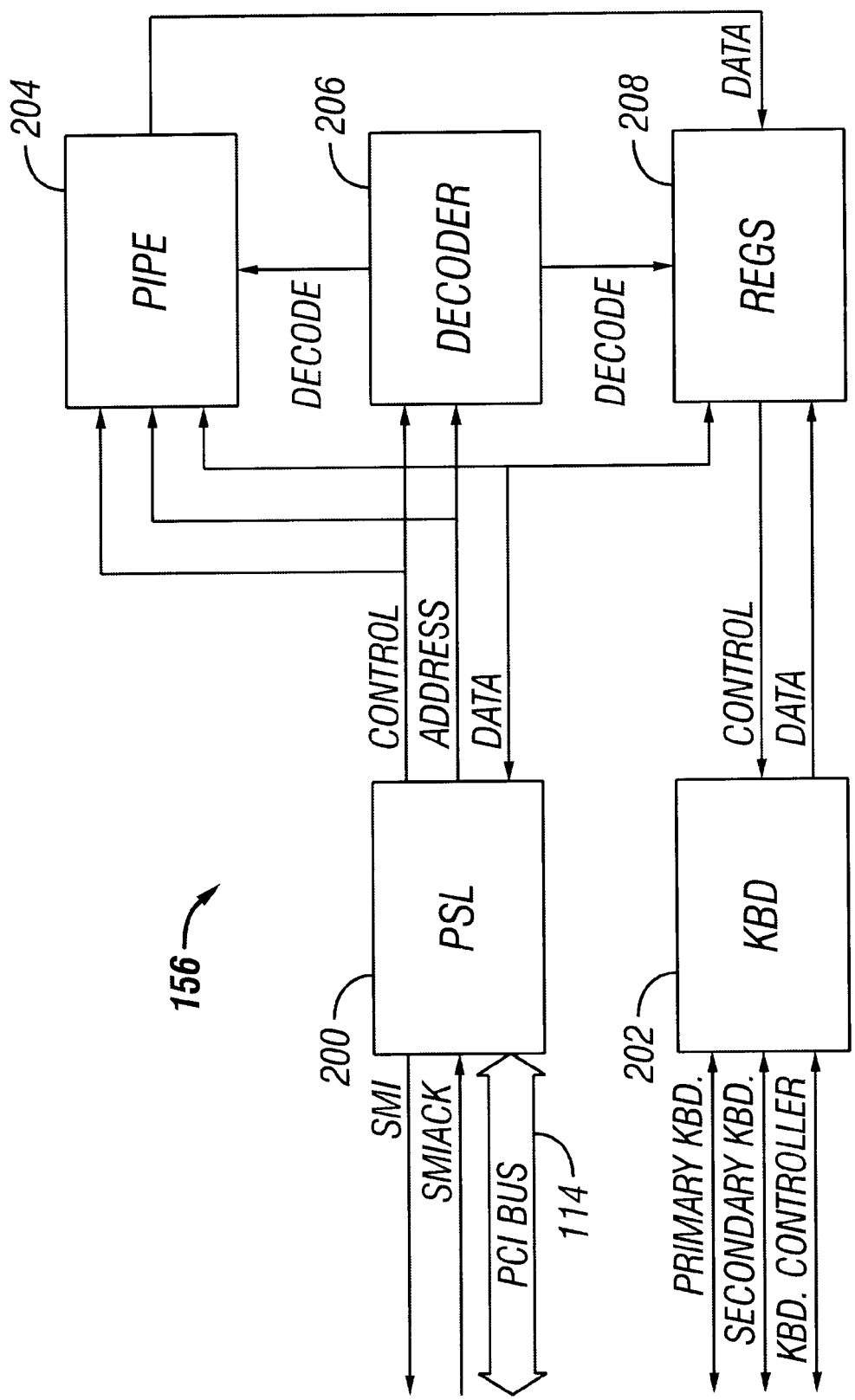
FIG. 3 is a block diagram illustrating the integrated remote console device of FIG. 1 according to the preferred embodiment.

Now examining the video functions of the IRC device 156 more closely, there is illustrated in FIG. 3 a block diagram of the IRC device 156. The IRC 156 includes a PCI slave logic unit (PSL) 200, a keyboard control unit (KBD) 202, a video information processing pipeline block (PIPE) 204, a decoder block 206 and a registers block (REGS) 208. Tables 4–19 contain a description of the IRC registers most relevant to this disclosure. The PSL 200 provides an interface to the PCI bus 114. The PSL 200 passes address, data and control information between the PCI bus 114 and the PIPE 204, DECODER 206 and REGS 208 blocks. The KBD 202 includes circuitry to provide the hot-plug keyboard and virtual keyboard feature described above. The DECODER 206 includes circuitry to provide the modem sharing and modem emulation functions described above in addition to other address decoding functions necessary for the operation of the IRC device 156. With respect to the video snooping, compression and encoding, this is handled by the PIPE block 204 in conjunction with the special SMI firmware 1000.

Video Information Processing Pipeline (PIPE)

Figure 4:
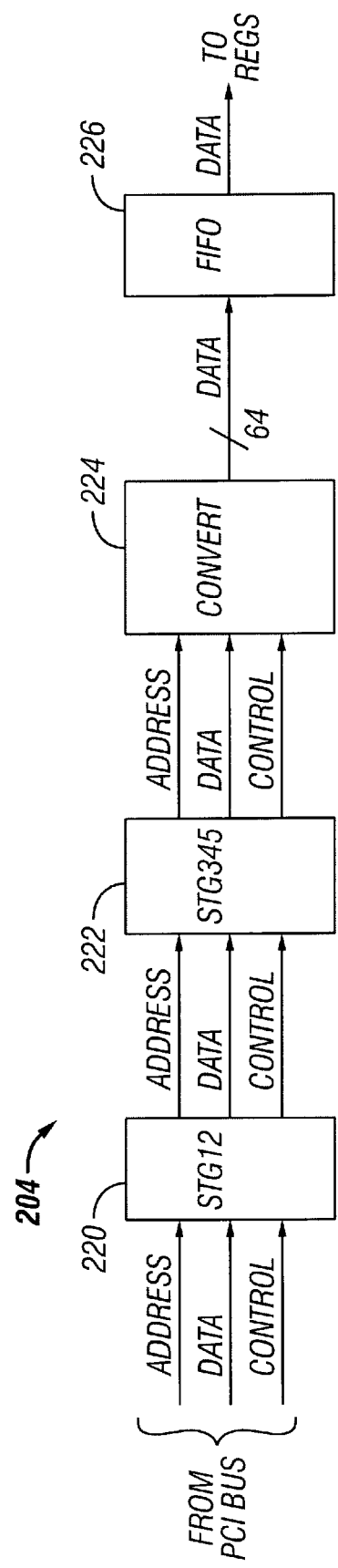
FIG. 4 is a block diagram illustrating the video processing pipeline (PIPE) block of FIG. 3 according to the preferred embodiment.

Now referring to FIG. 4, there is illustrated a more detailed block diagram of the PIPE block 204. The PIPE block 204 is essentially a pipeline of data processing elements, with the data being video information, including video data, command and control. The video information is clocked through the pipeline at the PCI bus clock rate, such as 25–33 MHz, unless otherwise noted. The video information is snooped from the PCI bus 114 and received into a stage 12 module 220 (STG12) where move operations are detected and data processing is performed accordingly. The processed address, data and control information is passed from the STG12 module 220 to a stage 345 module 222 (STG345) where repetitive operations are detected and compressed. It is noted that the labels STG12 and STG345 originally denoted the number of stages present, however they no longer do so, as will be discovered below.

A data conversion module 224 (CONVERT) receives the processed address, data and control information from the STG345 module 222 where the CONVERT module 222 converts the information flow from a 32-bit bus into a 64-bit bus with byte lane enables. Concatenation is performed by disregarding empty byte lanes and by shifting. The 64-bit bus is received into a first-in-first-out (FIFO) memory module 226 and stored until read out by the SMI firmware 1000. The FIFO module 226 includes certain preprocessing elements that cause all byte lanes to be filled before incrementing the FIFO input pointer. The FIFO 226 of the preferred embodiment is 8 quadwords deep. When a programmable FIFO threshold is reached, a system management interrupt causes the processor to enter system management mode and empty the FIFO 226. The processing performed by the SMI firmware 1000 is discussed below.

At certain stages of the processing of the snooped video information by the IRC 156, special escape codes are inserted to identify certain sequences processed by the IRC 156. By encoding repetitive data or block move operations, the data stream is compressed and efficiency is enhanced. Table 1 describes the four escape codes used. Those skilled in the art will recognize that these escape codes are already defined in the ANSI character set. However, because typically these particular ANSI codes are infrequently used they where chosen to be used as escape codes. Other ANSI codes can be used by programming the first of four sequential ANSI codes into a register of the IRC device 156. An escape code signifies to the SMI firmware 1000 that a special operation or event has occurred which is encoded in the data following the escape code. The protocol defined between the IRC device 156 and the SMI firmware 1000 causes the first byte following the escape code to be interpreted as an op code. The op code defines the operation and following data, if any. Table 1 defines the escape codes and op codes.

TABLE 1

Escape and Operation Codes

| Escape Code | Op Code Description | Op Code |
|---|---|---|
| F0 | Single byte indicates change in address; direction; attribute presence; or data presence. | bit definitions: 0 - data present 1 - attribute present 2–4 - x 5 - up/down dir change 6 - move operation 7 - address present |
| F1 | Indicates a video I/O command including: cursor change; start address change; cursor size; and mode change. Bit 7 set means two more bytes follow to make a word value. | Word Definitions: 80h cursor position change; 81h cursor size change; 82h video RAM start address change; Byte Definitions: 00h Attribute mode change; 01h screen size change; |
| F2 | Single byte indicates number of times operation is repeated. | 0-255 |
| F3 | Two bytes indicate number of times operation is repeated. | 0-65535 |

Figure 5A:
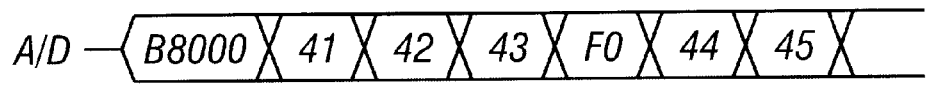
FIG. 5A is a timing diagram illustrating a sequence of video; data
Figure 5B:
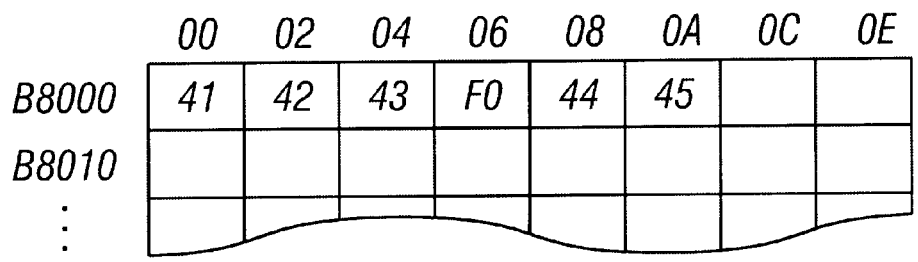
FIG. 5B is a diagram of the contents of the video buffer 158 corresponding to the data sequence of FIG. 5A.
Figure 5C:
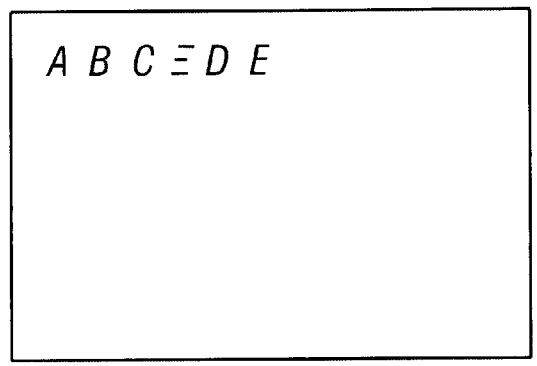
FIG. 5C is a diagram of a video display illustrating the characters displayed as a result of the video data sequence of FIG. 5A.

Now turning to FIGS. 5A–D, there is illustrated a data flow diagram showing inputs to the IRC 156 and corresponding output generated by IRC 156. In FIG. 5A, a number of PCI cycles are shown where the characters represented by h41, h42, h43, hF0, h44 and h45 are written to the video buffer 158 starting at address hB8000. In FIG. 5B, the data contained in the video buffer 158 is illustrated in the video frame buffer and in FIG. 5C, the corresponding video display is illustrated with the corresponding characters displayed.

Figure 5D:
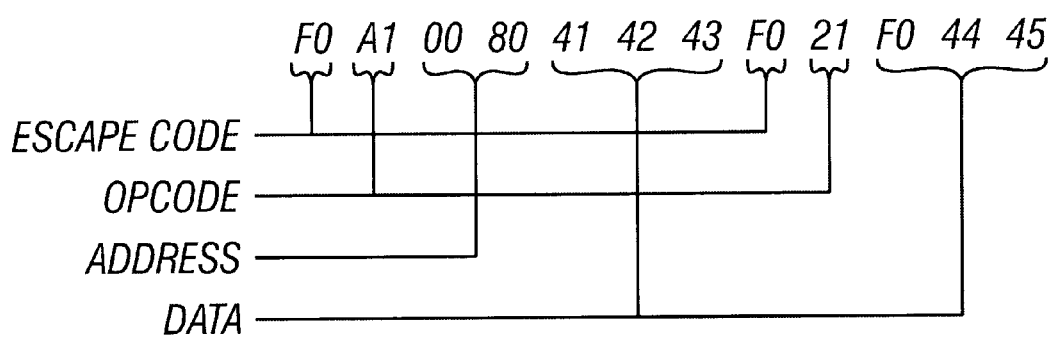
FIG. 5D is a diagram illustrating an encoded data sequence produced by the IRC device in response to the video data sequence of FIG. 5A according to the preferred embodiment.

In FIG. 5D, the IRC device 156 output corresponding to the input of FIG. 5A is shown. The first byte provided by the IRC 156 is the hF0 escape code indicating that a special operation or event is following in the data stream. The protocol defined between the IRC device 156 and the SMI firmware 1000 mandates that an op code follows the escape code. If the op code indicates a new address, the new address follows the op code, followed by an attribute byte and/or data byte, if any. In this example, the op code indicates that a new address and data byte are present. The up/down bit is one indicating an ascending address. The next two bytes following the op code indicate the positive offset from the address hB000, (h8000). Since no attribute byte is present, the attribute remains unchanged from its previous assignment. A first data byte (h41) follows the address. Since the address is sequential, the next two data bytes (h42 and h43) also follow without any further special codes.

The fourth data byte written is the character represented by hF0. Since this character is used as an escape code, the hF0 escape code must follow a "literal" hF0 so that the SMI code will be forced to interpret the data following the escape code as data instead of another escape code. Hence, an hF0 escape code and h21 op code are inserted before the literal hF0. This indicates to the SMI code that although the address, direction and attribute have not changed, a new data byte is present. Thus, the SMI firmware 1000 interprets the data byte hF0 as the ANSI character hF0, instead of an escape code. Again, since the data following ANSI hF0 are at sequential addresses, the remaining data simply follows the hF0 without further special coding. The coding for escape codes hF1–F3 are similar. It is noted that the example of FIG. 5D also illustrates the default encoding for random writes since each random write would simply be prefaced by the escape and op codes to indicate a new address.

The SMI firmware 1000 receives the proprietary encoded data stream to further process the data stream into a more condensed data stream. The final stages of compression with the SMI firmware 1000 also involve converting the proprietary encoded data stream into an ANSI encoded data stream so that conventional communications programs can easily interpret the data.

As mentioned before, the division between hardware and software processing is a design choice based on performance and cost balancing. One skilled in the art could virtually eliminate the IRC device 156 in favor of a pure SMI firmware 1000 implementation. The processor can be configured to trap on every video access, thereby providing the snooping function of the IRC device 156. The SMI firmware 1000 can then perform all the processing that the preferred embodiment IRC device 156 is responsible for. Alternatively, the SMI firmware 1000 could take snapshots of video memory at regular intervals and transmit the difference.

Figure 6A:
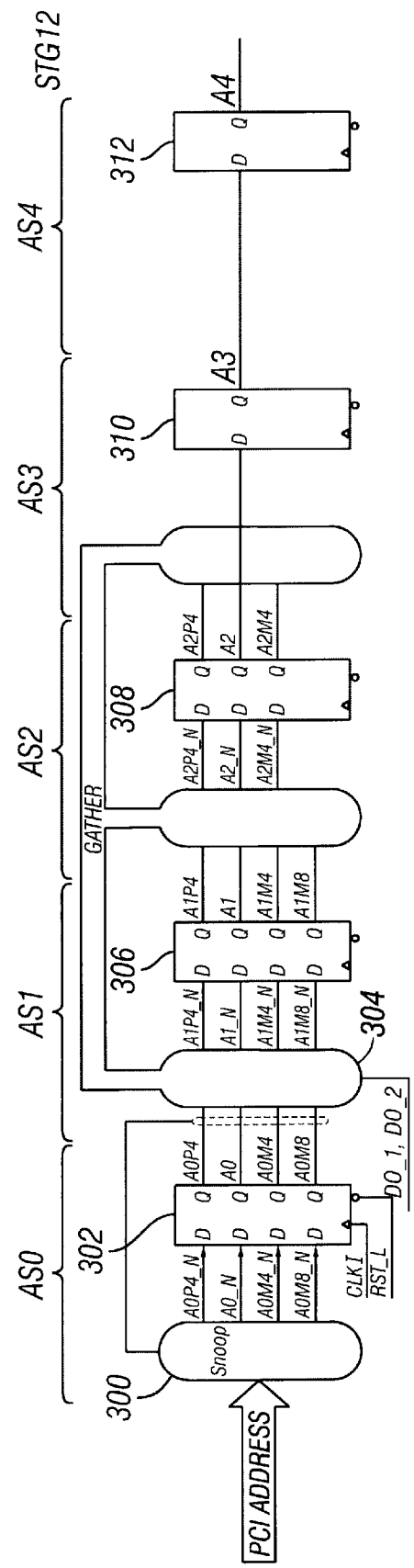
FIGS. 6A and 6B are block diagrams illustrating the STG12 of FIG. 4 according to the preferred embodiment.
Figure 6B:
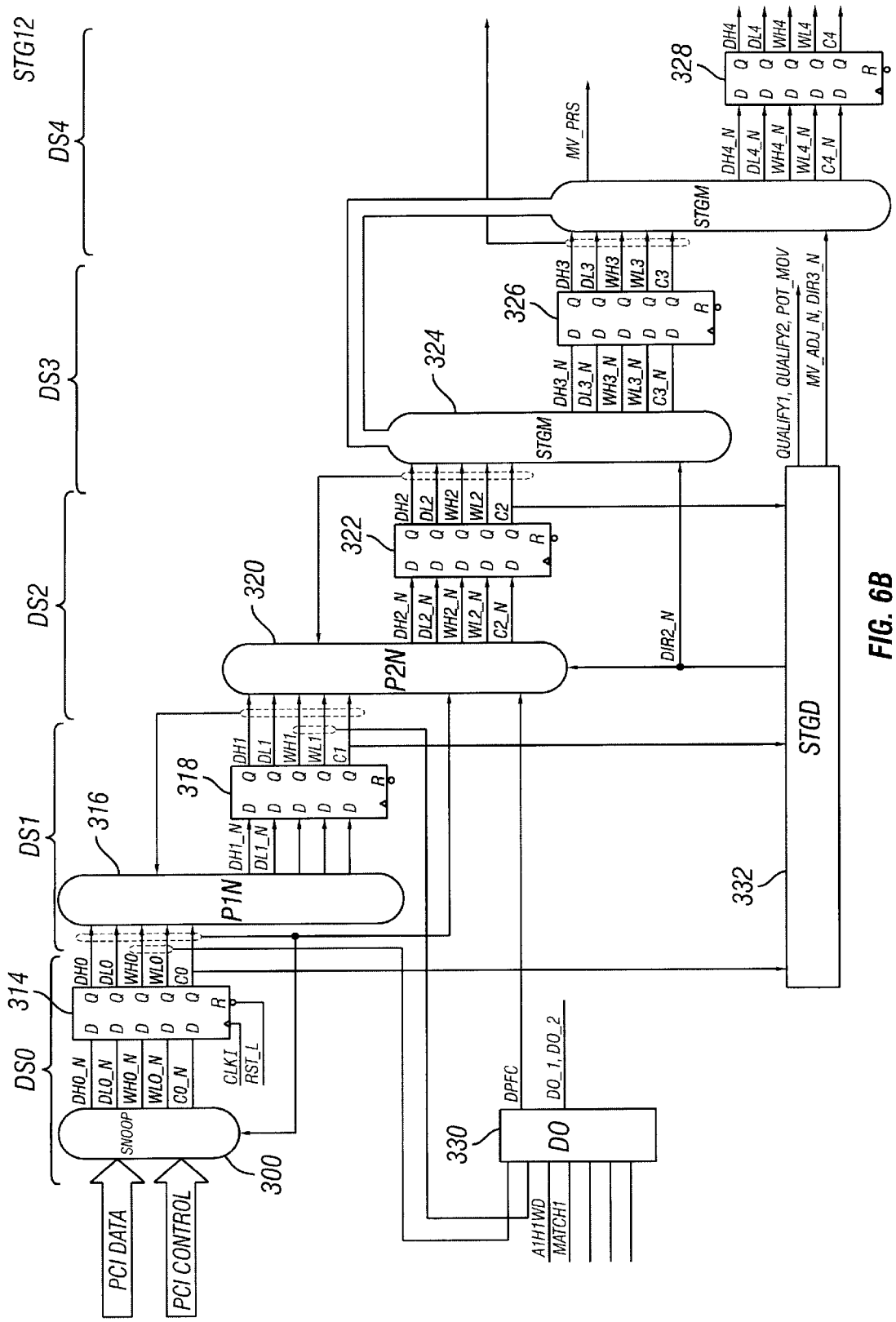

Now turning to FIGS. 6A and 6B, there is illustrated a more detailed block diagram of the STG12 module 220. Generally, the STG12 module 220 contains two parallel pipelines of five stages (0–4) each. Each stage of the pipeline is clocked by a PCI clock (CLKI) and reset by a system reset (RST_L) signal. The oval shaped elements generally indicate combinatorial logic. FIG. 6A illustrates an address processing pipeline having address stage registers AS0–AS4 and FIG. 6B illustrates a video information processing pipeline having data stage registers DS0–DS4. Video information herein includes video text data intended for the video buffer 158 and video command and control I/O intended for the video controller 136. However, for consistency with the figures, video information will hereinafter be simply referred to as video data.

Referring first to FIG. 6A, all video cycles are monitored by snoop logic 300 of the STG12 module 220. Snooping is the concept of monitoring and selectively collecting bus transactions as they pass along a bus to their destination. Snooping does not redirect or claim the transaction. PCI address, data and control information as well as address, data and control values from registers 302 and 314 are received into the snoop logic 300 to snoop cycles destined for the video controller 136 and video buffer 158. In addition to providing the snooped address (Ax_N and Ax), the snoop logic 300 generates three additional addresses from the snooped cycle address, a plus h4 address (AxP4_N and AxP4)), a minus h4 address (AxM4_N and AxM4) and a minus h8 address (AxM8_N and AxM8), where "x" denotes the stage number. (The "_N" suffix refers to an input signal or bus.) The calculations are performed at the snooping stage so that the address addition and subtraction circuitry need be present only once in the pipeline. Each address bus is 30 bits.

A register 302 receives the four addresses of the snoop logic 300 into its D inputs. The Q outputs of the register 302 are provided to a gather module 304 and back to the snoop logic 300. The gather module 304 is connected to the inputs and outputs of a register 306 and the inputs and certain outputs of a register 308. The gather module 304 is responsible for unifying two cycles that have been split apart by the processor 101 as a result of an operation straddling a 32-bit address boundary. For example, a Dword (32-bit) read from location h00000002 by an x86 class processor produces two bus cycles; a high word (16-bit) read from location h00000000 and a low word read from location h00000004. Furthermore, the x86 class processor of the preferred embodiment performs the read at location h00000004 before the read at location h00000000, thereby further complicating the unification process. The gather module 304 re-unifies the two cycles as one Dword cycle to location h00000002. Additionally, because the video data in text mode is a 16-bit quantity, the gather module 304 "gathers" individual bytes of matching character/attribute pairs into a single word cycle.

The gather module 304 receives the address outputs of the stage 0 register 302, a stage 1 register 306 and a stage 2 register 308 to determine if an address at the stage 1 register 306 is equal to the address at the stage 0 register 302, equal to the address at the stage 0 register 302 plus h4, or equal to the address at the stage 0 register 302 minus h4. The comparison produces a MATCH1 signal which is an input to a do module 330 of FIG. 6B.

The do module 330 provides a DO_1 and a DO_2 signal to indicate to the gather module 304 what to "do" with the addresses in stages 1 and 2 respectively. Depending upon the DO_1 and DO_2 signals, the gather module 304 may 1) hold the address until another cycle is received; 2) pass the same address if the cycles are not misaligned or non-alignable; 3) increment the first address to develop a single Dword cycle from two misaligned cycles; or 4) decrement the first cycle address to develop a single Dword cycle from two misaligned cycles. The circuitry of gather 304 and do 330 is summarized in Table 2 below. The address provided to the stage 2 register 308 is the address provided as A4 from the stage 4 register 312 two PCI clocks later.

in, the "x" may hold the value of 0, 1, 2, 3, or 4. The "_N" suffix refers to an input signal or bus. Each of the stages are clocked with the PCI bus clock (CLKI) and reset with a system reset (RST_L) signal.

Video data is snooped from the PCI bus by the snoop logic 300 and captured into the stage 0 register 314. The video data of stage 0 is processed by a process/select stage 1 module (P1N) 316 and passed to a stage 1 register 318. The video data of stage 1 is processed by a process/select stage 2 module (P2N) 320 and passed to a stage 2 register 322. The process/select stages 316 and 320 shift bytes and words of video data according to Table 2. The video data of stages 2–4 is further processed by a move detection (STGM) module 324 in conjunction with a direction detection (STGD) module 332. These two modules work together to detect block move operations which are used to detect screen scroll operations. A move operation is defined as those types of operations where two or more adjacent locations in video buffer 158 are moved in a block to another location in memory. A read/write/read where the read operations are to adjacent addresses is an early indicator of a move operation. If a move operation is detected, the data of the move operation is deemed irrelevant since it is already known to the video buffer 158, and the local computer 190. Thus, performance is enhanced since unnecessary data transmissions are avoided. The move detection module 324 and direction detection module 332 encode information in the IRC 156 data stream output to indicate a source address, destination address and move length to the SMI firmware 1000. This information is inserted into the data stream by the move detection module 324 at registers 326 and 328 of

TABLE 2

Cycle Alignment and Coalescence

| | INCOMING BUS CYCLES | | | | CYCLE AFTER STG12 | | |
|---|---|---|---|---|---|---|---|
| OPERATION | A[31:2] | BE[3:0]# | DATA[31:0] | Comment | A[31:0] | BE[3:0] | Data |
| DWORD write to Word boundary | a<br>a − 4 | 1100<br>0011 | xxxxDDDD<br>ddddxxxx | Word write high<br>Word write low | a − 2 | 0000 | DDDDdddd |
| WORD write to Byte boundary | a<br>a − 4 | 1110<br>0111 | xxxxxxDD<br>ddxxxxxx | Byte write high<br>Byte write low | a − 1 | 0110 | xxDDddxx |
| Coalesce byte writes into WORD writes | a<br>a<br>a<br>a<br>a<br>a | 1110<br>1101<br>1101<br>1110<br>1011<br>0111 | xxxxxxdd<br>xxxxDDxx<br>xxxxDDxx<br>xxxxxxdd<br>xxddxxxx<br>DDxxxxxx | | a<br>a<br>a + 2 | 1100<br>1100<br>1100 | xxxxDDdd<br>xxxxDDdd<br>xxxxDDdd |
| | a<br>a | 0111<br>1011 | DDxxxxxx<br>xxddxxxx | | a + 2 | 1100 | xxxxDDdd |

Figure 7A:
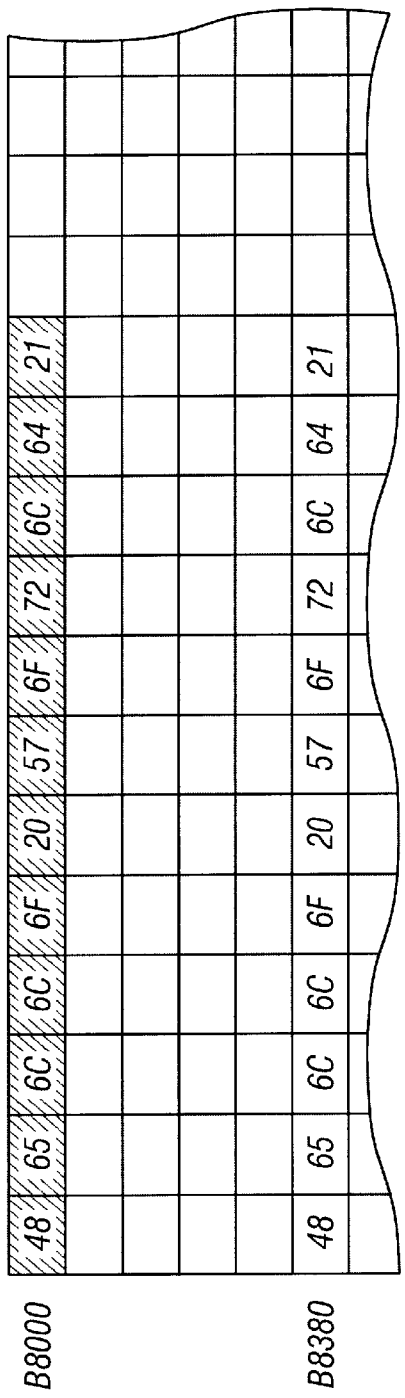
FIG. 7A is a diagram of memory locations of a video buffer illustrating data before and after a move operation.
Figure 7B:
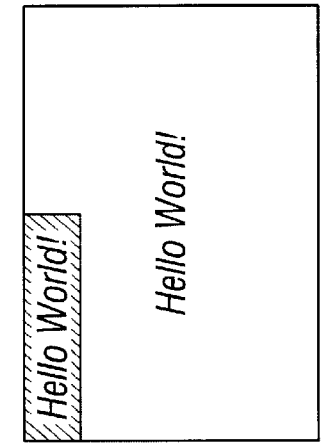
FIG. 7B is a diagram of a video display illustrating the move operation of FIG. 7A.
Figure 7C:
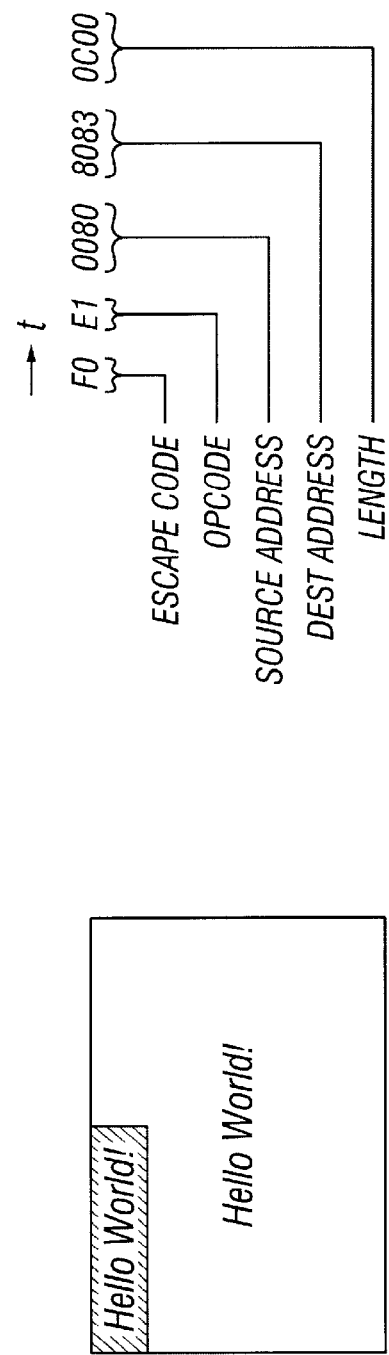
FIG. 7C is a diagram illustrating an encoded data sequence produced by the IRC device in response to the move operation of FIGS. 7A and 7B according to the preferred embodiment.

Referring now to FIG. 6B, there is illustrated a series of data stages (DS0–DS4) comprised of registers interleaved with data processing modules (P1N, P2N, STGM and STGD). Three pieces of information snooped from the PCI bus 114 and processed in the data stages are PCI data, PCI byte enables and PCI commands. The PCI data is divided into a high and low word (16-bits) portions as represented by the DHx_N, DHx, DLx_N and DLx buses, where "x" denotes the stage number and "H" and "L" denote the high and low word portions respectively. The byte enables are also divided into a high and low word portion as represented by WHx_N, WHx, WLx_N and WLx buses. The PCI command portion is represented by the Cx and Cx_N buses, and includes information on PCI read/write commands, PCI memory/I/O commands and other processing specific information. Depending on which stage the buses are referenced stages 3 and 4 respectively as illustrated in FIGS. 7A–7C. This allows the IRC facilities to quickly perform block moves over a telephone connection.

Referring now to FIGS. 7A–7C, there is illustrated an exemplary conversion of a move operation into an IRC 156 data stream. In FIG. 7A, there is illustrated the video frame buffer 158 where a portion of the frame buffer starting at address B8000 has been moved (shaded portion) to a starting address B8380, resulting in scrolling the screen down five lines, as shown in FIG. 7B. The move operation occurs when the ANSI value "48" is read from address B8000 and written to address B8380, followed by a series of read/write operations to addresses adjacent to the previous addresses.

When a read/write/read occurs and the reads are from adjacent addresses, the move detection module 324 places an escape code "hF0" into the lower data byte (DL4_N

[7:0]), an op code into the next data byte (DL4_N[15:8]), and a 16-bit source address into the upper data word (DH4_N) of register 326. FIG. 7C illustrates the IRC 156 data stream. The op code has a value of "hE1" to indicate that a new address is present, a move operation is occurring, the direction is up, the attributes are not present and data is present. Concurrently, the move detection module 324 places a 16-bit destination address into the lower data word of register 326 (DL3_N[15:0]). When the move operation is ended, the move detection module 324 places a 16-bit length value into the lower data word of register 328 (DL4_N [15:0]). The data stream between the destination address and length indication is null data.

Figure 8A:
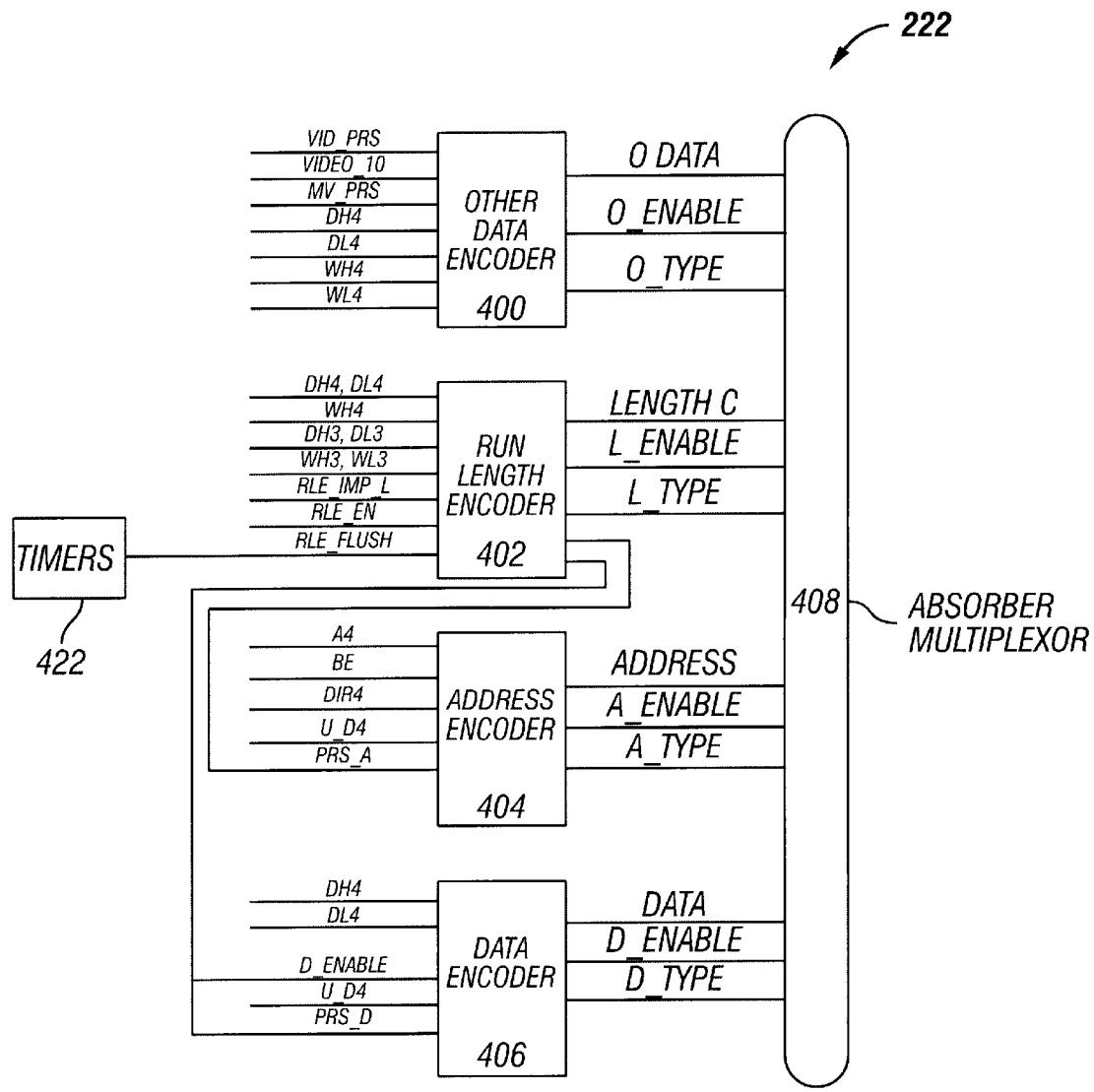
FIGS. 8A and 8B are block diagrams illustrating the STG345 of FIG. 4 according to the preferred embodiment.
Figure 8B:
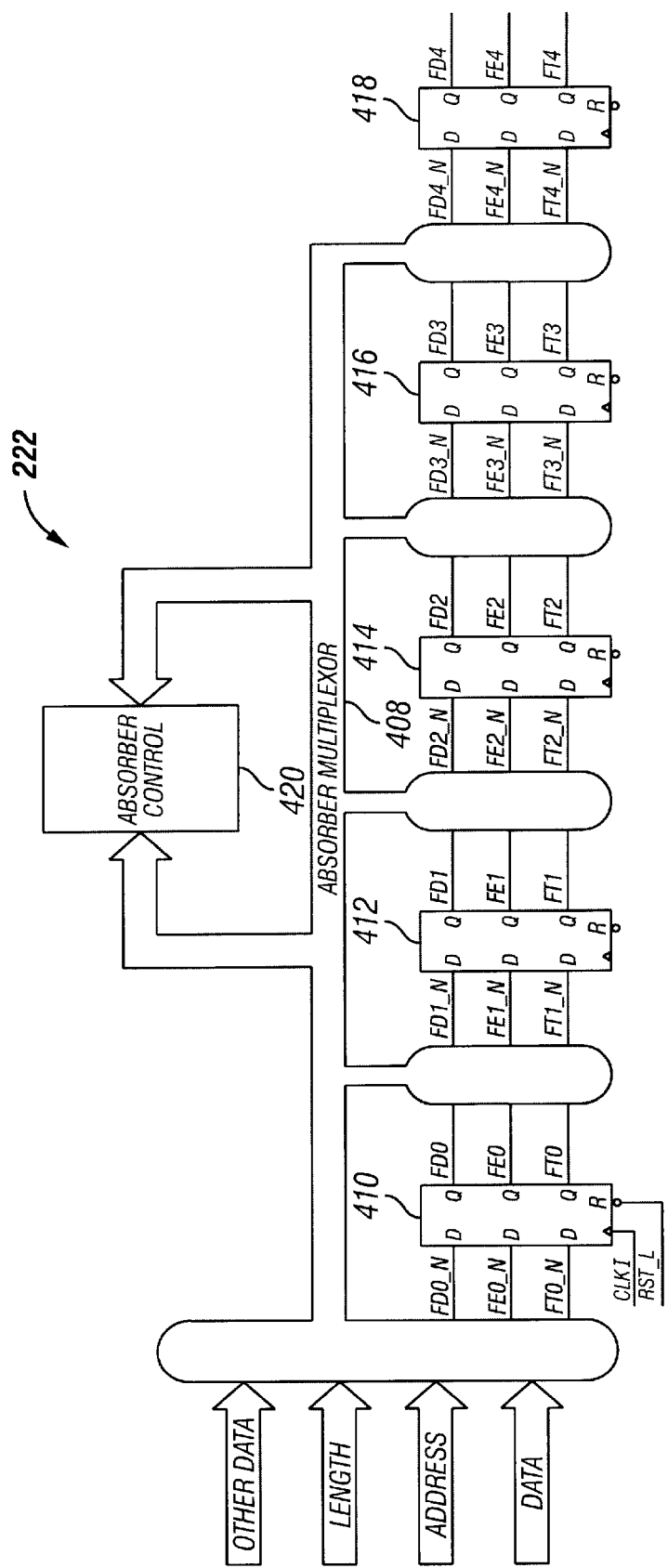

Now referring to FIGS. 8A and 8B, there is illustrated a more detailed block diagram of the STG345 module 222 of FIG. 4. The address, data and control information of FIGS. 6A–6B is received into a run length encoder 402, an address encoder 404 or a data encoder 406. Other data, such as commands to the video controller 136, is received into an other data encoder 400. Encoding refers to appending the escape codes and op codes to the data or in place of the data. The encoders pass encoded data into an absorber multiplexer 408 to absorb what is referred to as expanded data. Because the special escape codes and op codes are inserted into the data stream, data may expand to up to two times its actual size. Expansion occurs primarily due to the additional handling of literals and new addresses and the escape codes and op codes associated therewith. Referring to FIG. 8B, the absorber multiplexer 408 is shown interleaved between five registers 410–418 for inserting data at selected stages of the pipeline.

The other data encoder 400 receives commands sent to the video controller 136 from the snoop logic 300. A 6-bit video presence (VID_PRS) signal indicates the presence of an operation accessing one of six particular registers of the video controller 136. Of course, the circuitry could easily be adapted for other registers. The particular registers are: a miscellaneous output register; start address registers; cursor position registers; cursor size registers; mode control register and maximum scanline register. These registers are shadowed in the IRC device 156 and described in Tables 12–17. A 16-bit video input/output (VIDEO_IO) bus provides the data written to one of the six registers. A move presence (MV_PRS) signal is received from the move detection module 324 to indicate that a move operation is in progress. Additionally, the data (DH4, DL4) and byte enables (WH4, WL4) from register 328 are received.

A 32-bit other data (ODATA) bus is produced by selecting from one of seven possible sources; the data from one of the six registers if data is present, or DH4 and DL4 if a move operation is present. A 6-bit other enable (O_ENABLE) bus is produced to indicate which byte lanes are valid. A 3-bit other type (O_TYPE) bus is produced to indicate the data type, which in this case is "length."

A run length encoder module 402 receives data and byte enables from registers 326 and 328. A run length improvement (RLE_IMP_L) signal and a run length enable (RLE_EN) signal are received from a command/configuration register (Table 5) of the REGS module 208. A run length enable flush (RLE_FLUSH) signal is provided when either of a pair of inactivity timers 422 expires. One of the timers 422 is responsive to video buffer 158 accesses and another timer 422 is responsive to video controller 136 I/O accesses. If either timer 422 experiences a certain programmable period of inactivity, the RLE_FLUSH signal is provided to cause any data in the PIPE 204 to be flushed out to the SMI firmware 1000. The run length encoder 402 compares data and attribute bytes of upper and lower adjacent words to determine if the data/attribute pairs match. If a match is found, the direction of the operation is determined and a run length is accumulated until a mismatch of the data/attribute pairs is encountered and the run length terminates.

The length of the run length is provided by a 32-bit LENGTHC signal. The upper byte of LENGTHC is forced to zero, the next two lower bytes are the run length and the low byte is the escape code. If the run length is greater than 256 the escape code "F3" is used, otherwise the escape code "F2" is used. A length enable (L_ENABLE) signal indicates which byte lanes of LENGTHC are valid and a length type (L_TYPE) signal indicates that the data is a type "length."

The run length encoder 402 also provides indications of when address values are present on A4, and when data values are present on DH4 and DL4 so that the address and data can be encoded. An address encoder 404 receives the address presence (PRS_A) signal from the run length encoder 402, the address A4 from register 312, the byte enables from register 328, a direction signal (DIR4) from bits 7:5 of signal C4 of register 328 and an up/down (U_D4) signal from bit 4 of signal C4. The U_D4 signal indicates down if the data at register 326 is the first or any subsequent downwardly addressed data. An ADDRESS, A_ENABLE and A_TYPE signal are encoded by the address encoder 404 as follows:

| ADDRESS[31:00] | h00, LENGTH, escape code F2 or F3 |
| A_ENABLE[5:0] | b001111 |
| A_TYPE[2:0] | U_D4, 'adr&(2(PRS_A)). |

The A_TYPE signal indicates to downstream logic whether an address is present in any given clock cycle. The term 'adr is a constant representing a binary 01. The expression 'adr&(2(PRS_A)) yields 01b if PRS_A is active and 00b if PRS_A is not active. PRS_D below has similar treatment. LENGTH is a 16 bit term representing the length of a run length encoded operation.

A data encoder 406 receives the data presence (PRS_D) signal and a data enable (D_ENABLE[5:0]) bus from the run length encoder 402, the data DH4[15:0] and DL4[15:0] from register 328, and the up/down (U_D4) signal. DATA, D_ENABLE and D_TYPE buses are encoded by the data encoder 406 as follows:

| DATA[31:00] | DH4[15:0], DL4[15:0] |
| D_ENABLE[5:0] | D_ENABLE[5:0] |
| D_TYPE[2:0] | U_D4, 'dat&(2(PRS_D)). |

The D_TYPE signal indicates to downstream logic whether data is present in any given clock cycle. The term 'dat is a constant representing a binary 10. The lower four bits of the D_ENABLE bus indicate which byte lanes contain data (data and attribute). The upper two bits are set to "1" if either of the byte enables corresponding to the word lanes have changed. For example, it is common for data to be written to the video buffer 158 without a corresponding change to the attribute portion. The run length encoder strips out the attribute portion, thereby compressing the data. However, if the attribute is changed, the byte enable corresponding to the attribute would change. Hence, a new op code is needed to be generated to indicate this change. The upper two bits of D_ENABLE indicate when an escape code should be inserted to handle this such change according to the invention.

Therefore, if a run length is in progress, the length is accumulated by the run length encoder 402, data is held or indicated invalid by the data encoder 406 and the address is held or indicated invalid by the address encoder 404. When the run length has ended, the length, address and data are released to the absorber multiplexer 408 in the manner described below. If a run length is not being accumulated, transactions normally flow through the other data encoder 400, address encoder 404 and data encoder 406.

Referring now to FIG. 8B, the absorber multiplexer 408 receives the other data, length, address and data from the decoders 400–406 and via an absorber controller 420 determines where to place the incoming information. As can be seen from FIG. 8B, the information can be routed to any one of the five registers 410–418. It is the responsibility of the absorber controller 420 to place the incoming information at a point furthest down the pipeline, i.e., if the pipeline represented by registers 410–418 is empty, the absorber controller will place any incoming information in register 418. In this way, any subsequent expanded information can be placed in the upstream registers. Data arriving simultaneously is routed to two or more registers as shown in Table 3 below. The 1st register refers to the most downstream available register and the 2d and 3d registers are directly above the 1st register. For example, if registers 418 and 416 were filled, the first available register on the next clock cycle would be register 416. Once information is in the pipeline 410–418, it flows through uninhibited.

TABLE 3

| ~emptyA | ~emptyD | ~emptyL | 1st | 2d | 3d | Comment |
|---|---|---|---|---|---|---|
| 0 | 0 | 0 | — | — | — | nothing passed |
| 0 | 1 | 0 | data | — | — | |
| 1 | 1 | 0 | addr | data | — | |
| 1 | 1 | 1 | length | addr | data | |
| 0 | 1 | 1 | length | data | — | |
| 0 | 0 | 1 | length | — | — | |
| 1 | 0 | x | — | — | — | nothing passed |

Thus, the absorber controller 420 examines the x_TYPE signals to determine if values are present on a given clock cycle. If so, it is placed in the pipeline as shown above. The ~emptyA, ~emptyD and ~emptyL signals are "1" if address, data and length, respectively are present. Length data is absorbed before address and data, etc., as shown. However, there is one exception. The other data is always inserted at register 418. The pipeline is flushed when a video command and control cycle is snooped so that the other data is absorbed at register 418.

Figure 9:
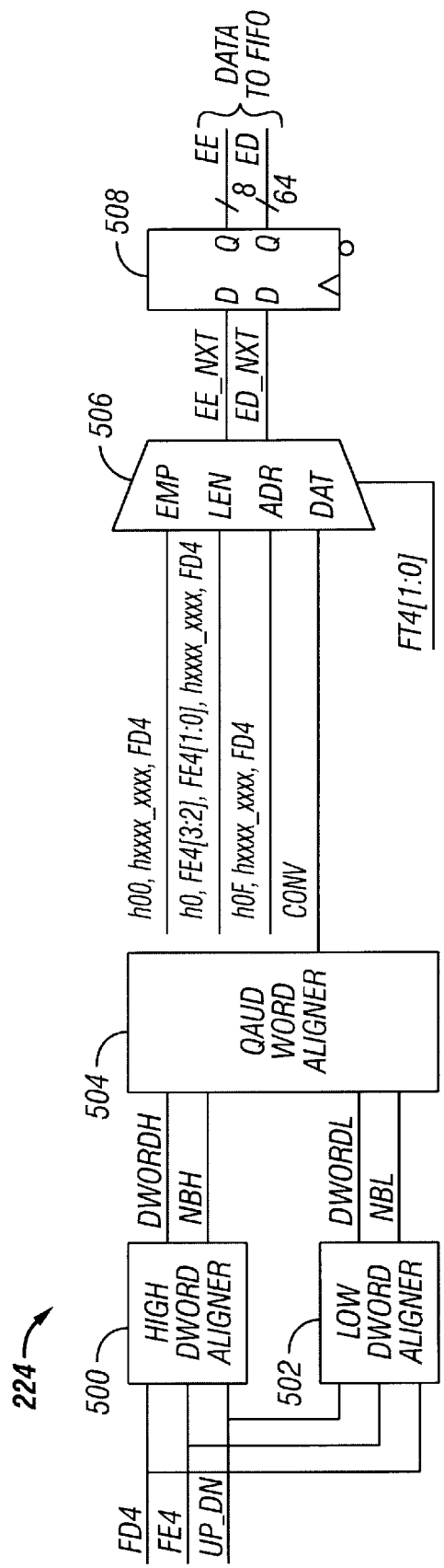
FIG. 9 is a block diagram illustrating the convert block of FIG. 4 according to the preferred embodiment.

Referring now to FIG. 9, there is illustrated a block diagram for the convert module 224. In the convert module 224, video data is concatenated by right shifting the data and converted into a 64-bit wide encoded data (ED) bus. This is done so that irrelevant or empty data is not written to the FIFO 226. A flip-flop 508 provides the concatenated data to the FIFO 226. The logic feeding in to the flip-flip 508 is combinatorial. An 8-bit encoded enable (EE) bus signifies which byte lanes of an encoded data (ED) bus are valid. The EE and ED buses are provided to the flip-flop 508 as buses EE_NXT and ED_NXT from a multiplexer 506 which selects from one of four inputs bases on the field type (FT4[1:0]). Four field types of the FD4[31:0] bus are possible: empty field, length, address or data. If the field type indicates the FD4 bus is empty, the EE_NXT bus is set to h00, the upper Dword of the ED_NXT is set to zero and the value of the FD4 bus is placed on the lower Dword. If the field type indicates the FD4 bus carries length data, the upper byte of EE_NXT is set to zero, the lower byte is set to FE4[3:0], the upper Dword of ED_NXT is set to zero and the value of the FD4 bus is placed on the lower Dword. If the field type indicates the FD4 bus carries address information, the EE_NXT bus is set to h0F, the upper Dword of ED_NXT is set to zero and the value of the FD4 bus is placed on the lower Dword. If the field type indicates the FD4 bus carries data, the multiplexer 506 passes to its output the output of a quad word aligner 504.

A high Dword aligner 500 and a low Dword aligner 502 work in conjunction with the quad word aligner 504 to right shift information. The aligners 500 and 502 each receive 8 or 16-bit chunks of video information; right shift the information; and append escape codes to the upper word of a 32-bit DWORDx output, if necessary. The "x" here refers to either "H" or "L", as shown. Thus, the information passed is of variable width.

As to the high Dword aligner 500, the video information is provided to the quad word aligner 504 on a high Dword (DWORDH[31:0]) bus. The number of bytes present is indicated on a NBH[2:0] bus from zero (b000) to four (b100). The high Dword aligner 500 receives the upper 16 bits of FD4[31:0], the byte enables contained in the lower two bits of FE4[5:0] and bit 4 of FE4[5:0] to provide the DWORDH bus. The upper 16 bits are evaluated for right shifting based on the number of bytes present. If only one byte of character or attribute code is present, the code is shifted to the least significant byte position of DWORDH and NBH is set to b001. If both character and attribute codes are present, the character code is placed in the high byte position of the lower word and the attribute code is placed in the lower byte position. NBH is set to b010 to indicate two bytes of code. If FE4[4] indicates a byte enable change and only one byte of character or attribute code is present, the code is placed in the lower byte position of the upper word and an escape code and op code are placed in the lower word. The escape code is F0 and the op code reflects whether character or attribute codes are present and the direction according to an UP_DN signal. In this case, NBL is set to b011 to indicate the presence of three bytes. If FE4[4] indicates a byte enable change and both codes are present, the character code is placed in the high byte position of the lower word, the attribute code is placed in the lower byte position, the escape and op codes are placed in the upper word and NBH is set to b100.

The low Dword aligner performs a similar shifting on the upper 16-bits of FD4[31:0] according to bits 5, 3 and 2 of FE4[5:0]. In the low Dword aligner 502, the video information is provided to the quad word aligner 504 on a low Dword (DWORDL[31:0]) bus. The number of bytes present is indicated on a NBL[2:0] bus from zero (b000) to four (b100). The low Dword aligner 500 receives the lower 16 bits of FD4[31:0], the byte enables contained in bits 2 and 3 of FE4[5:0] and bit 5 of FE4[5:0] to provide the DWORDL bus. The lower 16 bits are evaluated for right shifting based on the number of bytes present. If only one byte of character or attribute code is present, the code is shifted to the least significant byte position of DWORDL and NBL is set to b001. If both character and attribute codes are present, the character code is placed in the high byte position of the lower word and the attribute code is placed in the lower byte position. NBL is set to b010 to indicate two bytes of code. If FE4[5] indicates a byte enable change and only one byte of character or attribute code is present, the code is placed in the lower byte position of the upper word and an escape code and op code are placed in the lower word. The escape code is F0 and the op code reflects whether character or attribute codes are present and the direction according to the UP_DN signal. In this case, NBL is set to b011 to indicate the presence of three bytes. If FE4[5] indicates a byte enable change and both codes are present, the character code is placed in the high byte position of the lower word, the attribute code is placed in the lower byte position, the escape and op codes are placed in the upper word and NBL is set to b100.

The quad word aligner receives the DWORDH and DWORDL buses for right shifting according to the number of bytes are present in each Dword and providing a fully right shifted or converted output (CONV[71:0]). The upper 8-bits of CONV indicate which byte lanes are valid. Thus, twenty-five potential cases exist once the five cases for each upper and lower Dword are considered.

Referring now back to FIG. 4, the FIFO 226 receives the output of the CONVERT module 224 for storing until the virtual processor 101v reads it out. The FIFO 226 is preferably an eight quadword deep first in first out memory having a pointer to indicate the selected memory location. Data is written to the FIFO 226 every clock, however, the pointer is only incremented when a full 8 bytes are available. Recalling that the data is right shifted according to the CONVERT module 224, it may take several clocks for all 8 byte lanes to fill. When a programmable threshold is reached, an SMI is generated to cause the virtual processor 101v to empty the FIFO 226.

SMI Firmware

As stated above, the System Management Interrupt (SMI) firmware 1000 (also called SMM firmware) resides in the ROM 144 and is executed by the virtual processor 101v. The main function of the SMI firmware 1000 is to timely service System Management Interrupts generated by the IRC device 156, but the firmware 1000 it is not so limited. The SMI firmware 1000 is designed to quickly complete its requested task, but yet, maximize the overhead incurred to enter System Management Mode (SMM) by performing as many tasks as time permits so that a balance is reached and excessive processor time is not taken from the operating system. To facilitate such checking, the IRC device 156 includes a programmable timer that limits the amount of time spent in SMM at any one time.

Figure 10:
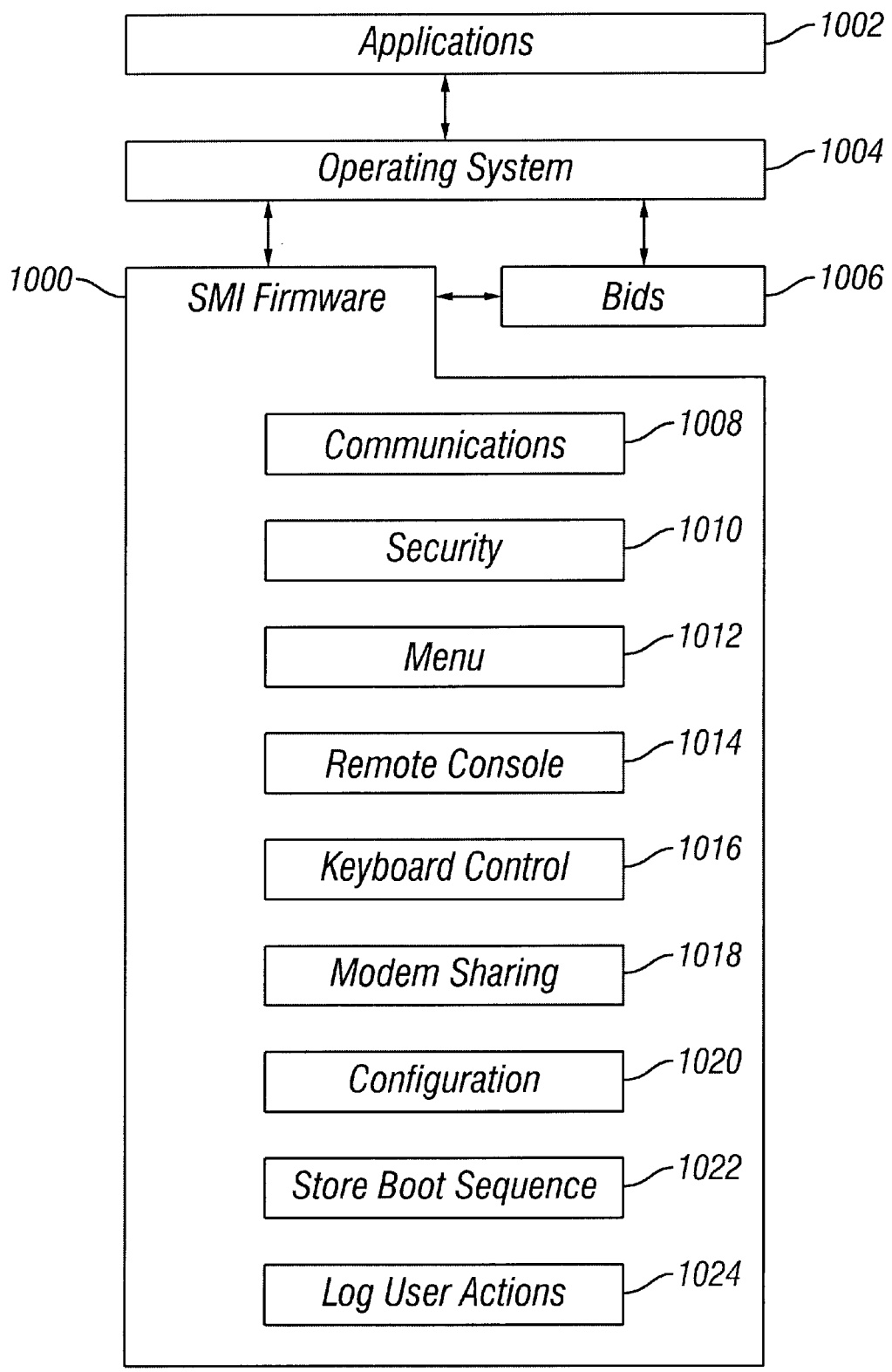
FIG. 10 is a block diagram illustrating the connectivity of certain portions of software of the computer system C according to the preferred embodiment.

Referring now to FIG. 10, there is illustrated a flow diagram of various software executed on the computer system C. The SMI firmware 1000 interacts with the system Basic Input/Output Services 1006 (BIOS), also stored in the ROM 144, and the operating system 1004 which itself interacts with applications 1002.

The SMI firmware 1000 is comprised of a number of submodules, including a communications module 1008, a security module 1010, a menuing system module 1012, a remote console module 1014, a keyboard control module 1016, a modem sharing module 1018, an IRC device 156 configuration module 1020, a boot sequence storing module 1022 and a logging module 1024. The communications module 1008 provides communication software to interact with modem 154. This module is responsible for answering and processing all incoming calls to the modem 154 as well as handling outbound calls for the IRC subsystem 180. It also hands out those calls not intended for the IRC subsystem 180 to the operating system. The security module 1010 authenticates incoming calls with a user name/password combination and provides an optional dialback mechanism. The menuing system 1012 presents the user with an easy to use menuing system by which the IRC subsystem 180 can be configured and with which the user can perform other actions not necessarily related to remote console. The keyboard control module 1016 allows the keyboard 192 of the local computer 190 to be used as if the virtual keyboard 192 was physically attached to the remote computer C. The keyboard module 1016 also handles keyboard switching and hot plug keyboard capabilities and allows programs to operate without a keyboard. The modem sharing module 1018 monitors use of the modem 154 so that any changes by the operating system 1004 or modem applications 1002 may be recovered to restore the modem to a known state. The IRC configuration module 1020 allows the user to use menu selections to configure all aspects of the IRC subsystem 180. The stored boot sequence module 1022 functions to store video cycles during a boot sequence for later playback by a user. The log user actions module 1024 functions to log specific actions by users for viewing at a later time.

Of particular interest to the present invention is the remote console module 1014 of the SMI firmware 1000. The remote console module 1014 provides much of the intelligence for the IRC subsystem 180. This module removes data from the IRC device 156 and transmits it to the local computer 190. The firmware 1000 is configurable to directly pass compressed (native) data from the IRC device 156 to the local computer 190 or preferably convert the compressed data into a conventional ANSI data stream usable by conventional communications software. More specifically, the remote console module 1014 is responsible for removing data from the FIFO of the IRC device 156; handling any FIFO overflows; converting the data, if necessary, from an IRC native mode into an ANSI compatible format; transmitting the data via the modem 154; handling video mode changes; and sending screen snapshots to the local computer 190, if necessary. The ANSI character set includes certain primitives, such as line scroll, repeat, clear screen and clear to end of line which are utilized to describe the data stream and provide further data compression. To this end a copy of the video buffer 158 is maintained in SMM memory 110v, which is 8 kbytes in size (although 16 k is preferred), so that the data stream can be further analyzed during the ANSI translation.

Figure 11A:
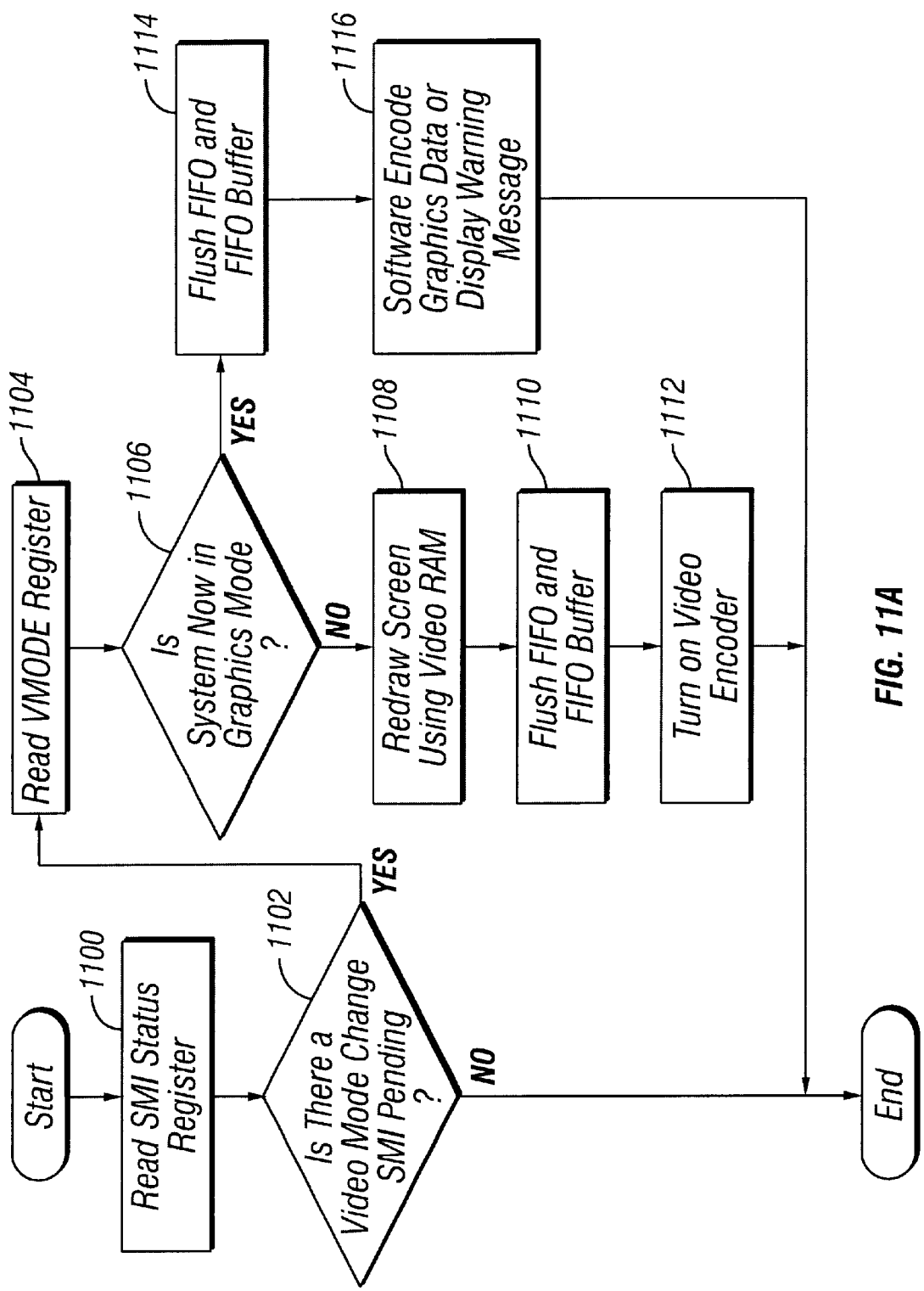
FIGS. 11A–11C are flow diagrams of the SMI firmware of FIG. 10 according to the preferred embodiment.
Figure 11B:
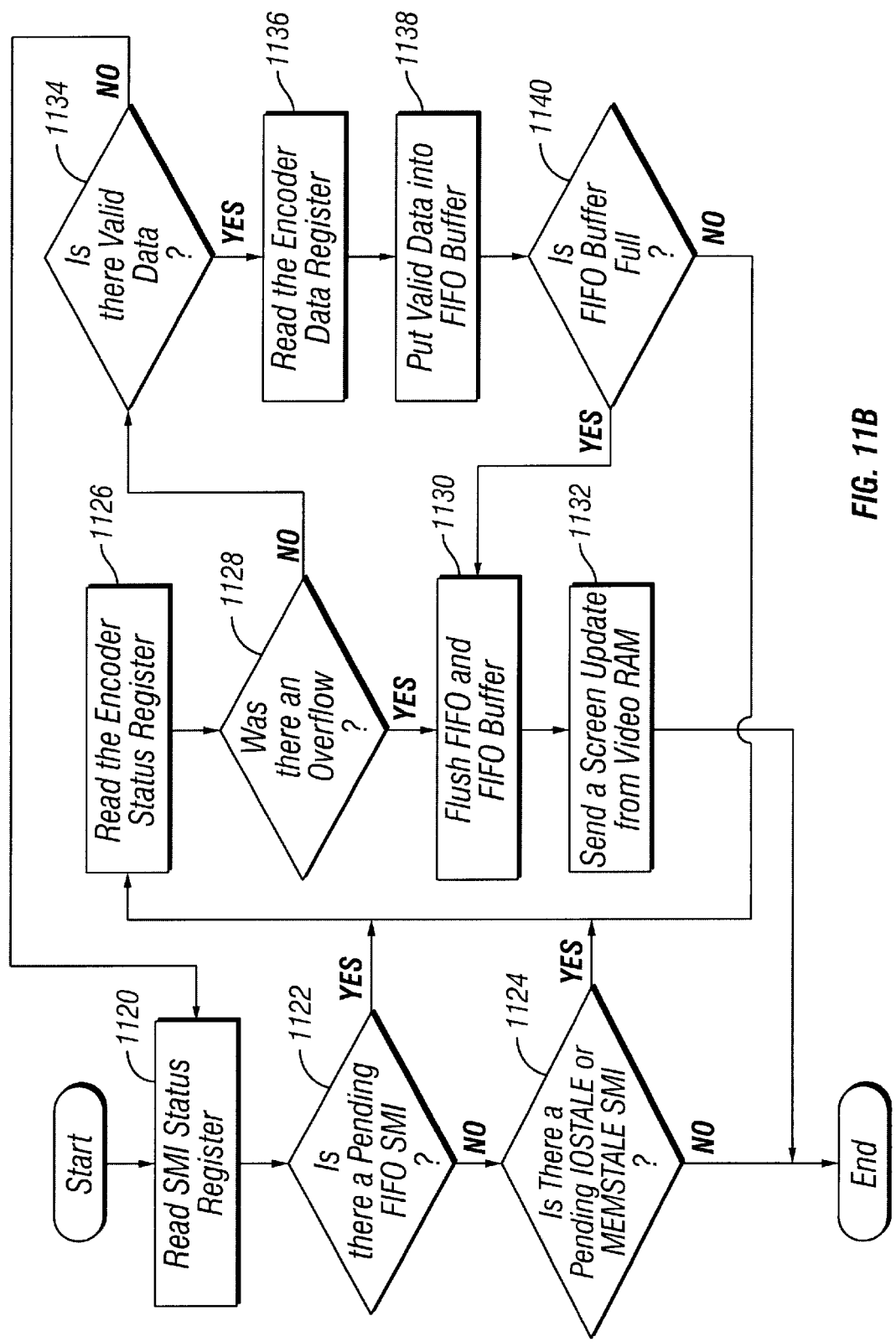
Figure 11C:
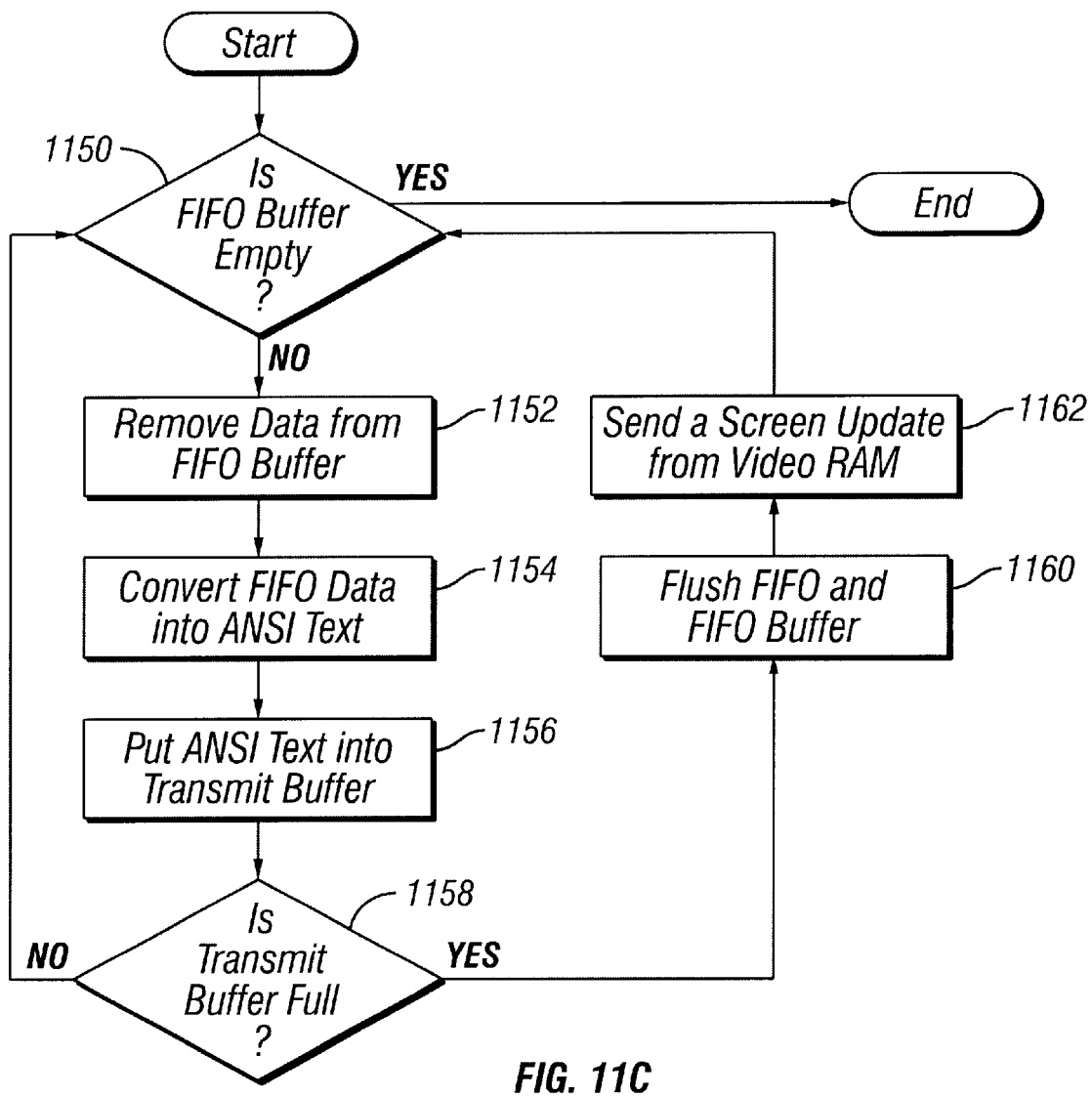

Now referring to FIGS. 11A, 11B and 11C there are illustrated flow diagrams of the remote console module 1014 pertaining to the above noted features. Referring first to FIG. 11A, the SMI firmware 1000 begins processing by reading the SMI status register (SSR) (Table 8) at step 1100 to determine the source of the SMI event. At this point, the SMI firmware 1000 can branch into any of the modules enumerated above, however, for purposes of clarity only the remote console module is further described. If there is a video mode change pending, at step 1102 the SMI firmware 1000 branches into the remote console module 1014, at step 1104, where the CRT mode control shadow register (VMODE) (Table 17) is read. At step 1106, the remote console module 1014 determines if the video mode change was to graphics mode by reading bit zero of the VMODE register. If the change was to text mode, processing continues to step 1108 where a screen snapshot is sent to the local computer 190, including all video I/O registers (Tables 12–17) and an image of the current screen. At step 1110, the data stream of the IRC device 156 including the FIFO 226 is flushed out to remove any lingering graphics mode data. At step 1112, the video encoder is enabled to handle text mode data from this point forward.

If at step 1106 it was determined that the system is now in graphics mode then processing continues to step 1114 where the data stream of the IRC device 156, including FIFO 226, is flushed to remove any lingering text mode data. At step 1116, a warning message is sent for display at the local computer 190 indicating that the system is now in graphics mode and that although the keyboard continues to be functional no video updates will continue. If at step 1102 the status register indicated that there was not a video mode change pending then the remote console module 1114 completes.

Now referring to FIG. 11B the SMI firmware 1000 begins execution by reading the SMI status register (SSR) at step 1120 to determine the source of the SMI interrupt. At step 1122, the remote console module 1014 determines if there is a FIFO 226 interrupt pending by reading the SMI status register (SSR). If so, processing continues to step 1126 where an IRC encoder status register (ESR) (Table 6) is read to determine if there was a FIFO overflow condition. At step 1128, if an overflow condition exists then the remote console module 1014 branches to steps 1130 and 1132 where the FIFO is flushed and a screen update is sent from video buffer 158 to the local computer 190 so that the video screens are again in synch. If at step 1128 there was not an overflow condition present then the remote console module branches to step 1134 where the FEMPTY# bit is examined to determine if there is valid data present in the FIFO 226. If not so, then processing reverts back to step 1120. If valid data exists in the FIFO 226, then processing continues to steps 1136 and 1138 where data is read from an encoder data register (EDR) (Table 7) and written into a temporary FIFO buffer of SMM memory 110v. Processing continues at step 1140 where it is determined if the temporary FIFO buffer of SMM memory 110v is full. If so, processing branches to step 1130 where the FIFO 226 and temporary FIFO buffer of SMM memory 110v are flushed and a screen update according to the video buffer 158 is sent to the local computer 190 to resynchronize the displays of the computer system C and the local computer 190. If at step 1140 it is determined the buffer is not full then processing continues back to step 1126.

If at step 1122 it was determined that there are no FIFO interrupts pending, then execution continues to step 1124 where it is determined if there is a pending I/O stale or memory stale SMI interrupt (bits 5 and 6 of SSR). If so, processing continues to step 1126 as described above, otherwise, processing completes.

Now referring to FIG. 11C there is illustrated the processing performed after data is removed from the IRC device 156. At step 1150 it is determined whether the temporary FIFO buffer of SMM memory 110v is empty. If so, the process terminates since all data has been processed. Otherwise, the process continues to step 1152 where data is removed from the temporary FIFO buffer. At step 1154 and 1156 the data is converted into an ANSI compatible format, if required. The selection of ANSI translation is controlled via the configuration module 1020. It is understood that other formats or encoding could be used, especially when graphics mode is considered.

The remote console module 1014 maintains a complete copy of the video data displayed at the local computer 190 in the SMM memory 110v. A 8 kbyte buffer is maintained. Therefore, as the screen is drawn by the remote computer C, the remote console module 1014 can compare the incoming data to the data already sent to the local computer 190 to determine if the data can be represented by an ANSI command sequence. For example, 80 spaces might be interpreted as a clear line and 2000 spaces is interpreted as a clear screen. Further comparisons are made to determine if the screen is being redrawn as new data is drawn, in which case this existing data is disregarded since it has already been sent to the local computer.

Step 1154 either returns an ANSI compatible character or a native character as produced by the IRC device 156. At step 1156, the remote console module 1014 places the character of step 1154 into a modem transmit buffer for transmission to the local computer 190. At step 1158 it is determined whether the transmit buffer is full. If not so, processing continues back to step 1150. If so, the process branches to steps 1160 and 1162 where the FIFO 226 and temporary FIFO buffer of SMM memory 110v are flushed and a screen snapshot is sent from the video RAM 156 to the local computer 190 to resynchronize the screen. Processing then continues back to step 1150.

Therefore, the method and apparatus described above of the computer system C provides an efficient and non-intrusive means for a local computer to access the computer system C operating in a remote location. The video display of the remote computer C is available to the local computer 190 from power up. Special system firmware provides the remote console functionality independent of any operating system. Thus, an operator at the local computer 190 can observe, control and configure the remote computer C without having to be physically present. The IRC subsystem 180 provides this functionality in a cost effective manner not before disclosed.

TABLE 4

IRC Register Space

| R/W | Register Name |
|---|---|
| R/W | Command/Config Register (CCR) |
| R/W | Encoder Status Register (ESR) |
| R | Encoder Data Register (EDR) |
| R | Reserved for Encoder Data Register High (EDRH) |
| R/W | SMI Mask Register (SMR) |
| R | SMI Status Register (SSR) |
| R/W | Poll Timer |
| R/W | Reserved |
| R/W | Maximum SMI Time (MAXTIM) |
| R/W | SMI Holdoff Timer (HLDOFF) |
| R/W | Keyboard config Register (KCR) |
| R/W | Keyboard Data Register (KDAT) |
| R | Keyboard Status Register (KSTAT) |
| R/W | Controller Config Register (KCR) |
| R/W | Controller Data Register (KCDAT) |
| R/W | Reserved |
| R | Controller Status Register (KCSTAT) |
| R/W | VCD Command/Config (VCR) |
| R | VCD Status Register (VSR) |
| R/W | Reserved |
| R/W | Virtual Baud Rate Divisor Latch (VBRD) |
| R/W | Virtual Line Control Register (VLCR) |
| R/W | Virtual FIFO Control (VIIR) |
| R/W | Virtual Interrupt Enable (VIER) |
| R/W | Virtual Transmit Holding Register (TB) |
| R/W | Virtual Programmers Stratch (VPSR) |
| R/W | Last Modem Status (LMSR) |
| R/W | Last Line Status (llsr) |
| R/W | Virtual Modem Control (VMCR) |
| R | Cursor Size Shadow Reg (CSIZE) |
| R | Cursor Position Shadow Reg (CPOS) |
| R | CRT Mode Control shadow Reg |
| R | CRT Max Scanline Shadow Reg |
| R | Top of Memory Shadow Reg (VTOP) |
| R/W | |
| R/W | |
| R/W | Break Code Value #1 |
| R/W | Time Base Divisor |
| R/W | I/O Stale Timer |
| R/W | Memory Stale Timer |
| R/W | IO Password Register (PASSWD) |

TABLE 4-continued

IRC Register Space

| R/W | Register Name |
|---|---|
| R/W | AUX Command/Config (ACR) |
| R/W | |
| R/W | Reserved |
| R/W | General Purpose Output (GPOR) |
| R/W | Reserved |
| R/W | |
| R/W | |

TABLE 5

Command/Config Register (CCR) Read/Write

| R/W | Bit Description |
|---|---|
| R/W | Software Reset - Setting this bit to a 1 will place the IRC in software reset mode. All functions are disabled and registers are initialized to their powerup values. The IRC will remain in reset mode until this bit is written to 0. |
| R/W | FIFO Full Level. These bits specify the point, in DWORDs, at which the FIFO will initiate an empty procedure. In slave mode, this is the point at which an SMI will be generated. This value Will need to be set lower for MP systems, and higher for single CPU systems. This value will default to 0100 (4 DWORDs) or 16 bytes. |
| R/W | Software SMIACT# Emulation. This bit overrides the behavior of IRC's SMIACT# input. Certain system architectures wishing to incorporate IRC may not have a reliable SMIACT# output. (Multiprocessing, CPU to PCI posting buffers) When set, the "SMI acknowledge" indication used by IRC is performed manually by the SMI firmware. Upon entry into the SMI, the firmware will signal a "begin SMI" event by writing the correct password value to the IO Password Register. Upon exit, the firmware should signal an "end of SMI" by writing a value other than the password to the IO Password Register. This bit is used in conjunction with CCR[18] to protect IRC's address space from system software interference. |
| R/W | IO Cycle Decode Qualification. When set IO port accesses to the selected I/O space of IRC will only be decoded while the CPU is in SMI#. Since CCR[19:18] are used together to determine the behavior of I/O decoding, these bits should be written together.<br>    CCR[19:18]    Function<br>    X0    I/O Cycles Enabled Always<br>    01    I/O Cycles Enabled during SMIACT#<br>    11    I/O Cycles Enabled if unlocked via software |
| R/W | SMIACT# Direction. When set, IRC will drive the SMIACT# pin for system architectures that do not have a reliable SMIACT# output. In this mode, IRC will assert SMIACT# when a "begin SMI" event is signaled by firmware. (writing the correct password value to the IO Password Register) for hardware security, this output is further qualified with IRC's SMI# output. Consequently, SMIACT# Will only be asserted when SMI code writes the unlock value. IRC will negate SMIACT# when a "end of SMI" event is signaled. (firmware writing a value other that the password to the IO Password Register) If the SMIACT# Direction bit is clear (power-up state), SMIACT# is used as in input only. |
| R/W | Reserved |
| R/W | Keyboard Test Mode Enable. When set, the keyboard interface signals will be placed into test mode. This mode is intended for test vectors and ASIC verification only. When set, the primary and secondary keyboard clock and data lines will be delayed by one clock with respect to when they would ordinarily be driven. After assertion (driven low) these lines will be driven high for one clock then floated. A weak internal pull-up on these output buffers will guarantee the high state and "emulate" the external pull-up that would ordinarily exist n a real system environment. |
| R/W | Flush Pipe. Writing a 1 to this bit will force the IRC to flush its video pipeline. All incomplete operations will be terminated and the results flushed to the data pipeline. Software can poll the Video Processing Status Register (VPSR) for operation completion. |
| R/W | Bus Master Mode Enable. This bit enables bus master mode operation. The IRC will automatically empty its FIFO into memory at the location specified by the Destination Address Register (DAR) |
| R/W | Op code Interrupt Enable. When set (1), the IRC will generate an SMI for each op code encountered during the encode process. This is to allow software to quantize the data flow and perform optional global optimizations. |
| R/W | Special run-length improvement disable. When set (1), the IRC will use an old method to encode certain run-length sequences. |
| R/W | I/O Insert Enable. Turns on insertion of decoded I/O cycles into the encoded data stream. |
| R/W | Compare Adjacency Enable. Turns on adjacency handling. Debug feature. Must be set to 1 for normal operation. |
| R/W | Move Detect Enable. This bit turns on/off the move detection logic inside the video encoder. When off, all reads of video RAM are ignored and writes are seen as originating from the CPU. When on, the IRC will detect moves from video RAM to video RAM (scroll) and not encode the associated data. |
| R/W | RLE Enable. This bit enables the run length encoder inside IRC. |
| R/W | Video Encode Enable. When this bit is set to 1 the IRC Will enable its video cycle snooper. This bit must be set to 1 to enable the video encoder. when clear, all video accesses are bypassed |

TABLE 6

Encoder Status Register (ESR) Read/Write

| R/W | Bit Description |
|---|---|
| R/W | FBE[7:4] # FIFO Data Byte Enable High - These four bits are used by software to determine which byte lanes are valid in the FIFO read buffer. For convenience, a logical 0 indicates that the byte lane is used, and a logical 1 indicates that it is not. |
| R/W | FBE[3:0] # FIFO Data Byte Enables - These four bits are used by software to determine which byte lanes are valid in the FIFO read buffer. For convenience, a logical 0 indicates that the byte lane is used, and a logical 1 indicates that it is not. |
| R/W | VGA Color Detect. Monocrome/Color Detect - This bit is used by the SMI firmware to determine if the host system is running in color or monochrome text mode. If clear, the host system is running in monochrome mode, otherwise it is in color mode. |
| R/W | Pipeline Overflow. Pipeline Overflow Detect - Indicates that incoming video data has caused the pipeline to overflow. This bit will be set until explicitly written to a zero. Writing a 1 to this bit has no effect. |
| R/W | FIFO Overflow. FIFO Overflow Detect - Indicates that incoming video data has caused the FIFO to overflow. This bit will be set until explicitly written to a zero. Writing a 1 to this bit has no effect. |
| R/W | PEMPTY# FIFO Overflow Detect - Indicates that incoming video data has caused the FIFO to overflow. This bit will be set until explicitly written to a zero. Writing a 1 to this bit has no effect |
| R/W | FEMPTY# FIFO Not Empty - A 1 in this bit location indicates that the FIFO has a valid data. |

TABLE 7

Encoder Data Register (EDR) Read Only

| R/W | Bit Description |
|---|---|
| R | Encoded Data [31:0] A read of this register empties one DWORD from the video compression FIFO. Note: not all byte lanes are guaranteed to have valid data. Software must first examine the Encoder Status Register (ESR) to determine which byte lanes contain valid data. |

TABLE 8

SMI Status Register (SSR) Read Only

| R/W | Bit Description |
|---|---|
| R | Handling Time Exceeded. A 1 in this bit location indicates that MAXTIMER has expired and that the SMI firmware should exit from SMI as soon as possible. |
| R | Reserved, read as 00 |
| R | Auxiliary IRQ. A 1 in this bit location indicates that the auxiliary IRQ interrupt is pending This bit is set when a rising edge is detected on the selected IRQ and cleaned following a read of this port. |
| R | Aux SMI Input 2. A 1 in this bit location indicates that the auxiliary IRQ interrupt is pending. This bit is set when a rising edge is detected on the selected IRQ and cleared following a read of this port. |
| R | Aux SMI Input 1. A 1 in this bit location indicates an external SMI condition is pending. This allows external events to funnel SMI requests through IRC, simplifying and optimizing the SMI event handler. |
| R | Video Mode Change Interrupt. A 1 in this bit location indicates that the IRC has detected a change either to or from graphics mode. When a change to graphics mode is detected, the IRC will automatically disable further video encoding bit clearing bit 0 (Video Encode Enable) of the Command/Config Register (CCR) and sign this event by generating an SMI. When a change to text mode is detected, another SMI is generated to allow firmware to reenable the video encoder. Firmware can check the graphics mode state by checking bit 0 (Text/Graphics Mode) of the CRT Mode Control Shadow Register (VMODE). |
| R | Internal Keyboard Controller Interrupt. A 1 in this bit location indicates that an internal keyboard controller event needs to be serviced. Software must read the Keyboard Controller Status Register (KCSR) to determine which event took place. |
| R | Memory Stale. This bit is set when the Memory Stale Timer expires implying the IRC contains data that needs to be flushed. |
| R | I/O Stale. This bit is set when the IO Stale Timer expires implying the IRC contains data that needs to be flushed. |
| R | Poll Timer Interrupt. Set when internal poll timer has expired. |
| R | Keyboard Interrupt. A 1 in this bit location indicates that a keyboard event needs to be serviced. Software must read the Keyboard Status Register (KSR) to determine which event took place. |
| R | COM IRQ interrupt. A 1 in this bit location indicates that a COM interrupt is pending. Software must look at the active COM port to determine which specific COM interrupt event is present. This bit is set when a rising edge is detected on the selected IRQ and cleared following a read of this port. |
| R | VCD Interrupt. A 1 in this bit location indicates that a Virtual COM Device interrupt is pending. (Data port SMI, Loss of Carrier, etc.) Software must examine the VCD Status Register (VSR) to determine which event took place. This bit will be reset when that condition is satisfied. |
| R | FIFO Interrupt Pending. A 1 in this bit location indicates that a FIFO interrupt is pending. Software must examine the Encoder Status Register (ESR) to determine which event took place. This bit is set when the FIFO is more than half full or when an overflow has been detected. This condition can be cleared by removing items from the FIFO (read of the Encoder Data Register (EDR) or by manually resetting the FIFO. |
| R | System Board SMI asserted. A 1 in this bit location indicates that the system board has asserted a SMI#. This condition is latched inside IRC and cleared when a logical 0 is written to this bit location. |

TABLE 9

SMI Mask Register (SMR) Read/Write

| R/W | Bit Description |
|---|---|
| R/W | Handling Time Exceeded. Enables the corresponding SMI event. |
| R/W | reserved. Reserved, read as %00 |
| R/W | Auxiliary IRQ. Enables the corresponding SMI event. |
| R/W | Aux SMI Input 2. Enables the corresponding SMI event. |
| R/W | Aux SMI Input 1. Enables the corresponding SMI event. |
| R/W | reserved. Reserved, read as %0 |
| R/W | Internal Keyboard Controller Interrupt. Enables the corresponding SMI event. |
| R/W | Memory Stale Interrupt Enable. Enables the corresponding SMI event. |
| R/W | I/O Stale Interrupt Enable. Enables the corresponding SMI event. |
| R/W | Poll Time Interrupt enable. Enables the corresponding SMI event. |
| R/W | Keyboard Interrupt Enable. Enables the corresponding SMI event. |
| R/W | COM IRQ Interrupt Enable. Enables the corresponding SMI event. |
| R/W | VCD Interrupt Enable. Enables the corresponding SMI event. |
| R/W | FIFO Interrupt Pending Enable. Enables the corresponding SMI event. |
| R/W | System Board SMI asserted Enable. Enables the corresponding SMI event. |

TABLE 10

SMI Holdoff Timer (HLDOFF) Read/Write (8-bits)

| R/W | Bit Description |
|---|---|
| R/W | This register contains the time in microseconds that must pass between assertions of SMI. When this value is non-zero, no SMI's will be generated from the end of the last SMI until this amount of time passes. Once this timer expires an SMI may occur if a SMI event is pending. This timer allows the processor time to execute cycles between SMI's and to prevent O/S time-outs. The default value of this timer is 0 (off). |

TABLE 11

Maximum Time in SMI Timer (MAXTIMER) Read/Write (8-bits)

| R/W | Bit Description |
|---|---|
| R/W | This register contains the time in microseconds*8 that the SMI handler has to process the pending SMI events. (A value of 125 (decimal) would represent 1 ms.) When this timer expires, the "Handling Time Exceeded" bit in the SMI Status Register will be set. This bit is cleared upon reading the SSR. A value of 0 turns this timer off. This timer allows the SMI handler a method of determining that it has spent too long in SMI and must exit to prevent O/S time-outs. The default value of this timer is 0 (off). |

TABLE 12

Miscellaneous Output Register

| R/W | Bit Description |
|---|---|
| R/W | This register is read at location $xxC and written at $xx2. Bit 0 of this register selects the location of the CRTC I/O registers. A logical 0 sets CRTC addresses to hex $xx0 and Input Status register 1's address to $xxA. A logical 1 maps these registers to $xx0 and $xxA respectively. The IRC will snoop writes to $xxx and save off bit 0 to properly decode the CRTC registers and Input Status Register 1. |

TABLE 13

Cursor Position Shadow Register (CPOS) Read Only (16-bits)

| R/W | Description |
|---|---|
| R | This I/O location contains a shadowed version of the CRT Cursor Position registers. Updates to the CRT Cursor Position registers are snooped and the data is saved here. When either 8-bit parts of this register is modified, the I/O Stale Timer is reset and the register is marked a dirty. Upon expiration of this timer, a I/O Change Interrupt will be encoded into the video output stream. This register is provided to allow SMI firmware direct access to this information for debugging purposes. |

TABLE 14

Cursor Size Shadow Register (CSIZE) Read Only 16-bits)

| R/W | Description |
|---|---|
| R | This I/O location contains a shadowed version of the CRT Cursor Position registers. Updates to the CRT Cursor Position registers are snooped and the data is saved here. When either 8-bit parts of this register is modified, the I/O Stale Timer is reset and the register is marked as dirty. Upon expiration of this timer, a I/O change Interrupt will be encoded into the video output stream. This register is provided to allow SMI firmware direct access to this information for debugging purposes. |

TABLE 15

Top of Memory Shadow Register (VTOP) Read Only (16-bits)

| R/W | Description |
|---|---|
| R | This I/O location contains a shadowed version of the current video cursor size. Updates to the CRT Cursor Size registers are snooped and the data is saved here. When either 8-bit part of this register is modified, the I/O Stale Timer is reset and the register is marked as dirty. Upon expiration of this timer, a I/O Change Interrupt will be encoded into the video output stream. This register is provided to allow SMI firmware direct access to this information for debugging purposes. |

TABLE 16

CRT Max Scanline Shadow Register (MSCAN) Read Only (8-bits)

| R/W | Description |
|---|---|
| R | This I/O location contains a shadowed version of the CRT max Scanline Register. Updates to the CRT max Scanline register are snooped and the data is saved here. When this register is modified, the video compressor will be interrupted and an I/O Change Interrupt will be encoded into the video output stream. This register is provided to allow SMI firmware direct access to this information for debugging purposes. |

TABLE 17

CRT Mode Control Shadow Register (VMODE) Read Only (8-bits)

| R/W | Description |
|---|---|
| R | This I/O location contains a shadowed version of the CRT Mode Control Register. Updates to the CRT Mode Control register are snooped and the data is saved here. when this register is modified, the video compressor will be interrupted and an I/O Change Interrupt will be encoded into the video output stream. This register is provided to allow SMI firmware direct access to this information for debugging purposes. |

TABLE 18

Memory Stale Timer (MSTALE) Read/Write (8-bits)

| R/W | Description |
|---|---|
| R/W | This register contains the tie in milliseconds that the video compressor will wait before flushing video data to memory every time a memory cycle is snooped by the IRC, this value will be reset. When this timer expires, the video pipeline will be flushed and written to memory. This timer is set high enough to coalesce video operations, but short enough for the remote terminal to be updated adequately. The default value of this timer is 5 ms. |

TABLE 19

I/O Stale Timer (ISTALE) Read/Write (8-bits)

| R/W | Description |
|---|---|
| R/W | This register contains the time in milliseconds that the video compressor will wait before issuing certain I/O change interrupts. For certain events, (like updating cursor position) it is desirable to coalesce several I/O events into one. This timer is shared among the various applicable I/O registers that need to be snooped and encoded into the data stream. Whenever any o these registers are modified, this timer is reset and the corresponding register marked as dirty. when this timer expires, the video pipeline will be flushed and the dirty I/O register will be issued into the data stream. This timer is set high enough to coalesce multi-write operations, but short enough for the remote terminal to be updated adequately. The default value of this timer is 25 ms. |

TABLE 20

Break Code Value #1 (BCV1) Read/Write (8-bits)

| R/W | Description |
|---|---|
| R/W | This register contains the value which will be used to interrupt the data stream for op code boundaries. This register defines a block of four values which the compressor can use for this purpose. The default value is $xx, so $xx-$x4 are used by the compressor as break codes. Software should not need to modify this, but it is here just in case. |

TABLE 20-continued

Break Code Value #1 (BCV1) Read/Write (8-bits)

R/W  Description

Since this register defines a block of 4 consecutive values, the bottom two bits of this register are unused and are read as %00.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method of monitoring activity of a remote computer at a local computer, the remote computer coupled to the local computer by a communications channel, the remote computer having a bus coupled to a video controller that generates a video output responsive to video operations on the bus, the method comprising the steps of:

(a) snooping video operations occurring on the bus, said video operations containing data; and (b) transmitting the data over the communications channel to the local computer.

2. The method of claim 1 further comprising the step of:

(c) compressing a plurality of video transactions into a code, after step (a) and before step (b).

3. The method of claim 2, wherein said steps are performed by hardware.

4. The method of claim 2, wherein said steps are performed by software.

5. The method of claim 1 further comprising the step of:

(d) encoding one or more video transactions into a code, after step (a) and before step (b).

6. The method of claim 5, wherein step (d) is performed by hardware.

7. The method of claim 5, wherein step (d) is performed by software.

8. The method of claim 1, wherein said data includes text mode data, the method further comprising the step of:

(e) converting said text mode data into an ANSI compatible format, after step (a) and before step (b).

9. The method of claim 1, wherein the remote computer includes a buffer, the method further comprising the steps of:

(f) holding the data in a buffer; and (g) periodically removing the data from the buffer.

10. The method of claim 9, wherein the remote computer includes a programmable timer, the method further comprising the steps of:

(h) programming the timer with a timeout value;

(i) resetting the timer count when video activity is detected;

(j) decrementing the timer when inactivity is detected; and (k) flushing the data from the buffer when said timer expires.

11. The method of claim 10, wherein the remote computer includes a video frame buffer, the method further comprising the steps of:

(l) taking a snapshot of the video frame buffer;

(m) storing the snapshot in the buffer; and (m) providing the snapshot to the local computer.

12. The method of claim 1, wherein the communications channel is a telephone line.

13. The method of claim 1, wherein a step of snooping memory operations further comprises the step of snooping for a memory write to a video memory buffer.

14. An apparatus for monitoring video activity of a remote computer system, the remote computer system including memory and a data communications device, the data communications device connectable to a local computer for sending the video activity to the local computer, the apparatus comprising:

a processor operable in a system management mode, said processor for providing video transactions, said transactions comprising address, data, command and control portions;

a bus coupled to said processor, memory and data communications device, said bus for passing the video transactions to a video controller that generates a video output responsive to the video transactions on the bus;

a bus transaction snooping device coupled to said bus for snooping the video transactions; and a video transaction processing device coupled to said bus transaction snooping device, said video transaction processing device operable to encode the video transactions;

a first buffer for storing the encoded video transactions;

wherein the processor periodically reads the encoded video transactions from said first buffer and causes the encoded video transactions to be sent to the local computer via the data communications device.

15. The apparatus of claim 14, further comprising:

a local computer video data buffer for maintaining a copy of the encoded video transactions sent to the local computer;

wherein before the processor causes the encoded video transactions to be sent to the local computer, the processor compares the encoded video transactions from the first buffer to encoded video transactions stored in the video data buffer and wherein any encoded video transactions already contained in the video data buffer are not sent to the local computer.

16. The apparatus of claim 15, wherein said processor compares the encoded video transactions in a system management mode.

17. The apparatus of claim 14, wherein said video transaction processing device further includes:

address comparison logic for comparing sequences of video transaction addresses; and data comparison logic for comparing sequences of video transaction data, wherein the video transactions comprising block move operations and fill operations are encoded into a compressed data stream.

18. The apparatus of claim 14, further comprising:

a programmable inactivity timer, wherein when said programmable inactivity timer expires, the processor flushes the encoded video transactions from the buffer.

19. The apparatus of claim 14, wherein the remote computer includes a video frame buffer, the apparatus further comprising:

an overflow detection circuit for detecting an overflow condition of said first buffer, wherein when said first buffer overflows the processor copies said remote computer video frame buffer into said first buffer and causes the encoded video transactions to be sent to the local computer.

20. The apparatus of claim 14, wherein the video transactions are encoded into an American National Standards Institute (ANSI) character format.

21. The apparatus of claim 14, wherein the bus transaction snooping device snoops memory writes to a video memory buffer.

22. An apparatus for monitoring video activity of a remote computer system, the remote computer system including memory and a data communications device, the data communications device connectable to a local computer for sending the video activity to the local computer, the apparatus comprising:

a processor operable in a system management mode, said processor for providing video transactions, said transactions comprising address, data, command and control portions;

a bus coupled to said processor, memory and data communications device, said bus for passing the video transactions to a video controller that generates a video output responsive to the video transactions on the bus;

a hard disk system coupled to said bus;

a bus transaction snooping device coupled to said bus for snooping the video transactions;

a video transaction processing device coupled to said bus transaction snooping device, said video transaction processing device operable to encode the video transactions; and a first buffer for storing the encoded video transactions; wherein the processor periodically reads the encoded video transactions from said first buffer and causes the encoded video transactions to be sent to the local computer via the data communications device.

23. The apparatus of claim 22, further comprising:

a local computer video data buffer for maintaining a copy of the encoded video transactions sent to the local computer, wherein before the processor causes the encoded video transactions to be sent to the local computer, the processor compares the encoded video transactions from the first buffer to encoded video transactions stored in the video data buffer and wherein any encoded video transactions already contained in the video data buffer are not sent to the local computer.

24. The apparatus of claim 23, wherein said processor compares the encoded video transactions in a system management mode.

25. The apparatus of claim 22, wherein said video transaction processing device further includes:

address comparison logic for comparing sequences of video transaction addresses; and data comparison logic for comparing sequences of video transaction data, wherein the video transactions comprising block move operations and fill operations are encoded into a compressed data stream.

26. The apparatus of claim 22, further comprising:

a programmable inactivity timer, wherein when said programmable inactivity timer expires, the processor flushes the encoded video transactions from the buffer.

27. The apparatus of claim 22, wherein the remote computer includes a video frame buffer, the apparatus further comprising:

an overflow detection circuit for detecting an overflow condition of said first buffer, wherein when said first buffer overflows the processor copies said remote computer video frame buffer into said first buffer and causes the encoded video transactions to be sent to the local computer.

28. The apparatus of claim 22, wherein the video transactions are encoded into an American National Standards Institute (ANSI) character format.

29. The apparatus of claim 22, wherein the bus transaction snooping device snoops memory writes to a video memory buffer.

\* \* \* \* \*